May 13, 1947.　　　　　O. WITTEL ET AL　　　　2,420,633
INSTRUMENT FOR TESTING AND DEVELOPING THE STEREOPTIC
ACUITY OF A PERSON'S EYES
Filed Sept. 2, 1943　　　　15 Sheets-Sheet 1

OTTO WITTEL
GEORGE J. KOCH
JOSEPH L. BOON
INVENTORS

BY
ATTORNEYS

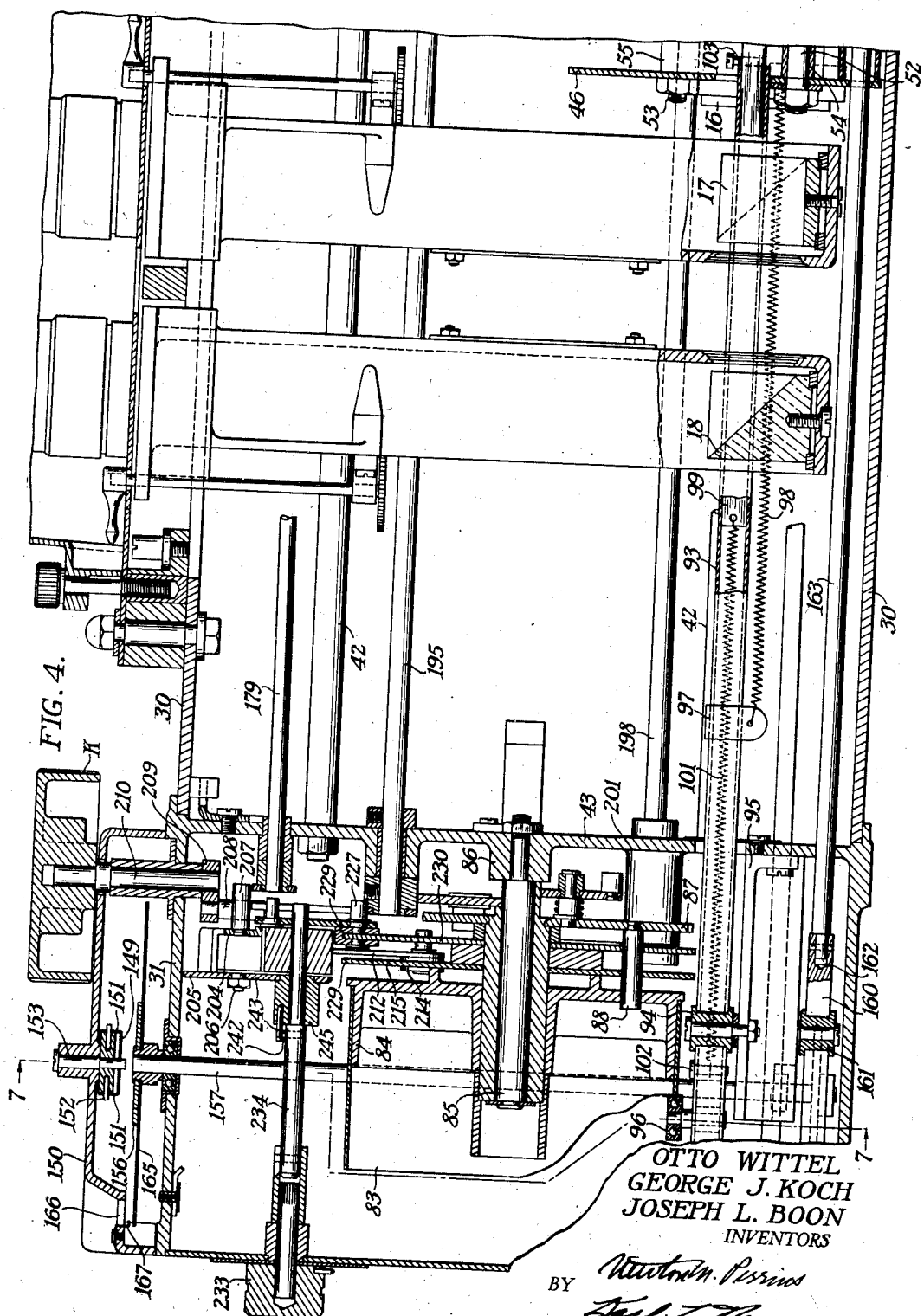

May 13, 1947.                    O. WITTEL ET AL                    2,420,633
           INSTRUMENT FOR TESTING AND DEVELOPING THE STEREOPTIC
                          ACUITY OF A PERSON'S EYES
                           Filed Sept. 2, 1943                15 Sheets-Sheet 3

FIG. 5.

OTTO WITTEL
GEORGE J. KOCH
JOSEPH L. BOON
            INVENTORS

BY

ATTORNEYS

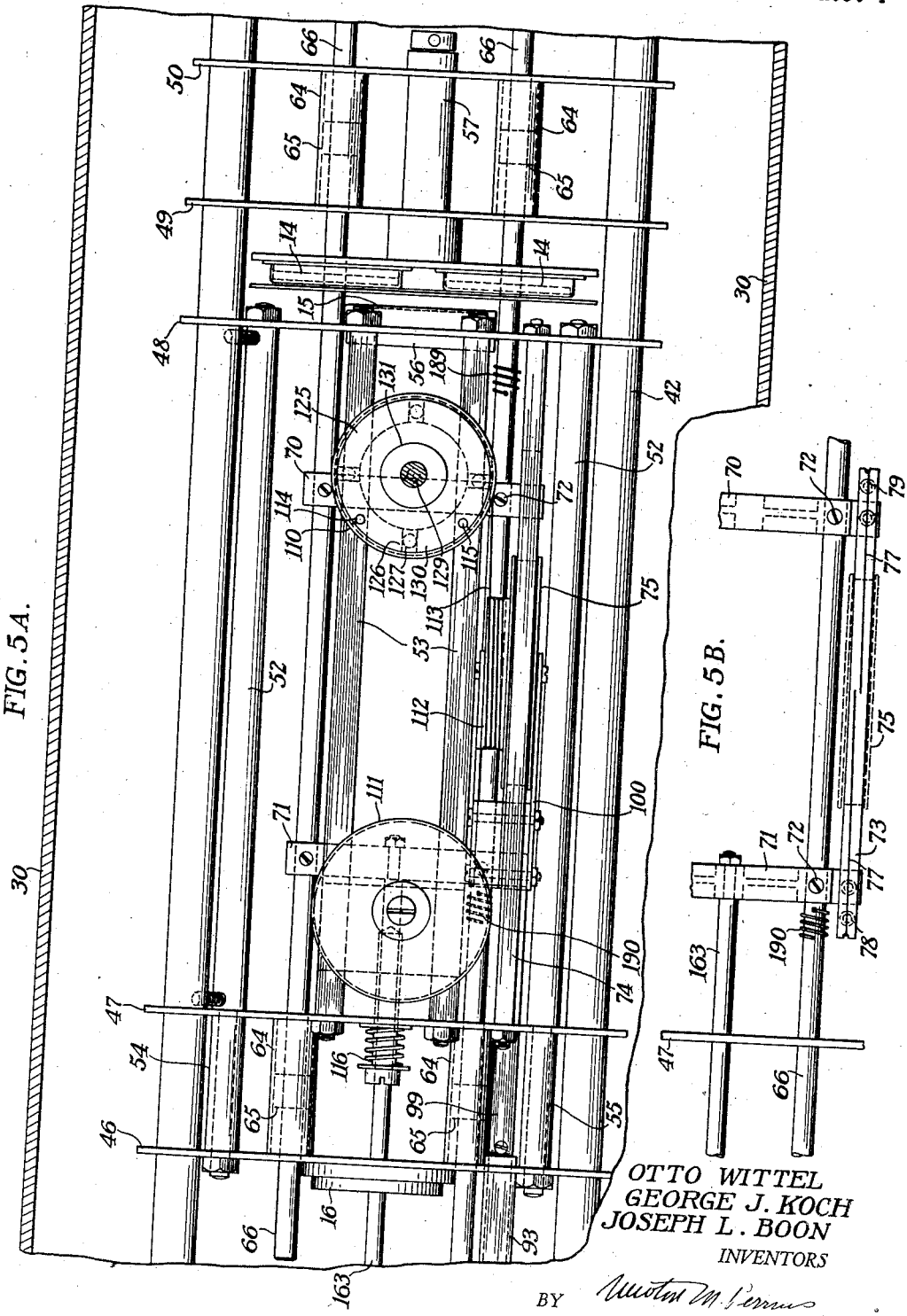

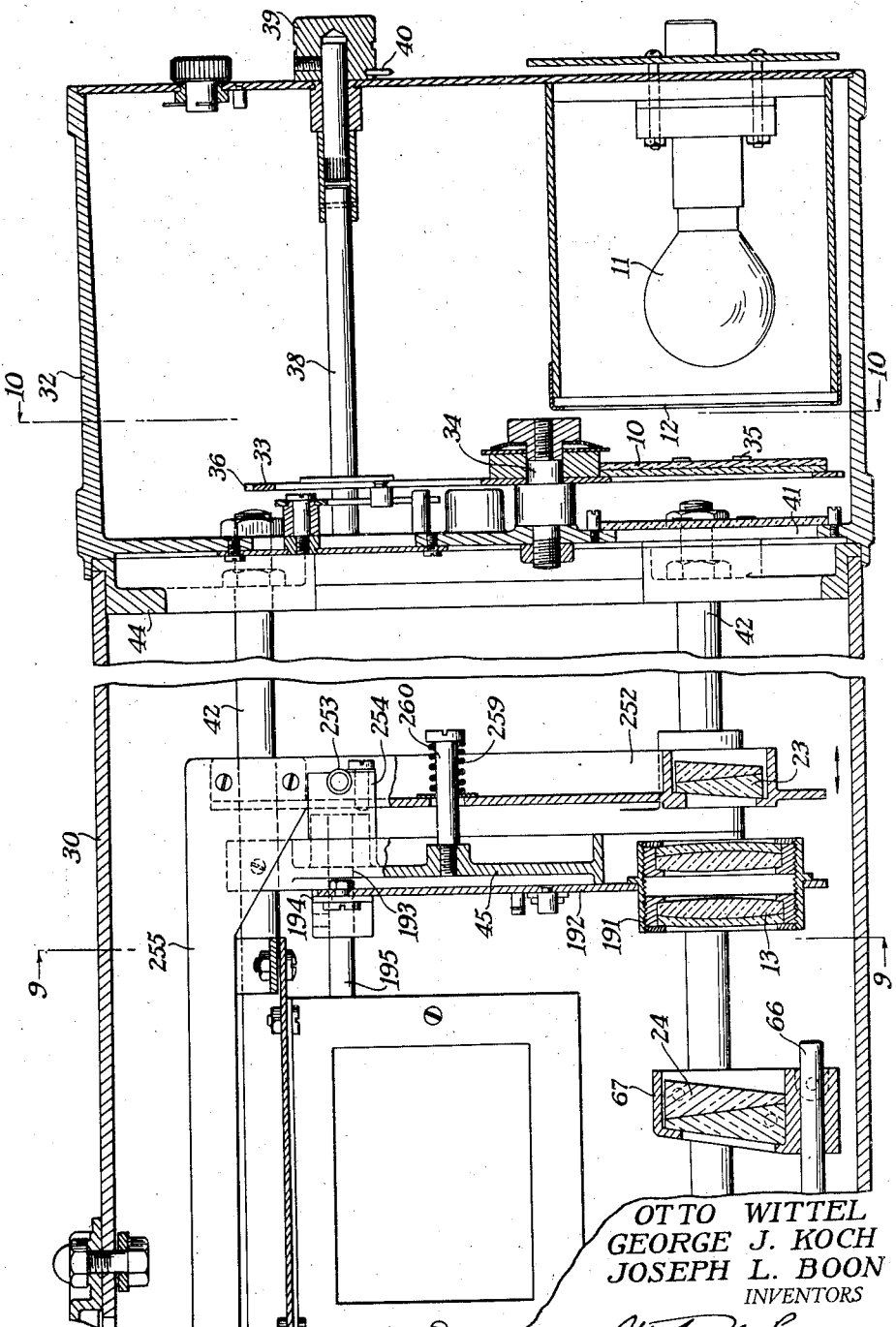

May 13, 1947.　　　O. WITTEL ET AL　　　2,420,633
INSTRUMENT FOR TESTING AND DEVELOPING THE STEREOPTIC
ACUITY OF A PERSON'S EYES
Filed Sept. 2, 1943　　　15 Sheets-Sheet 6
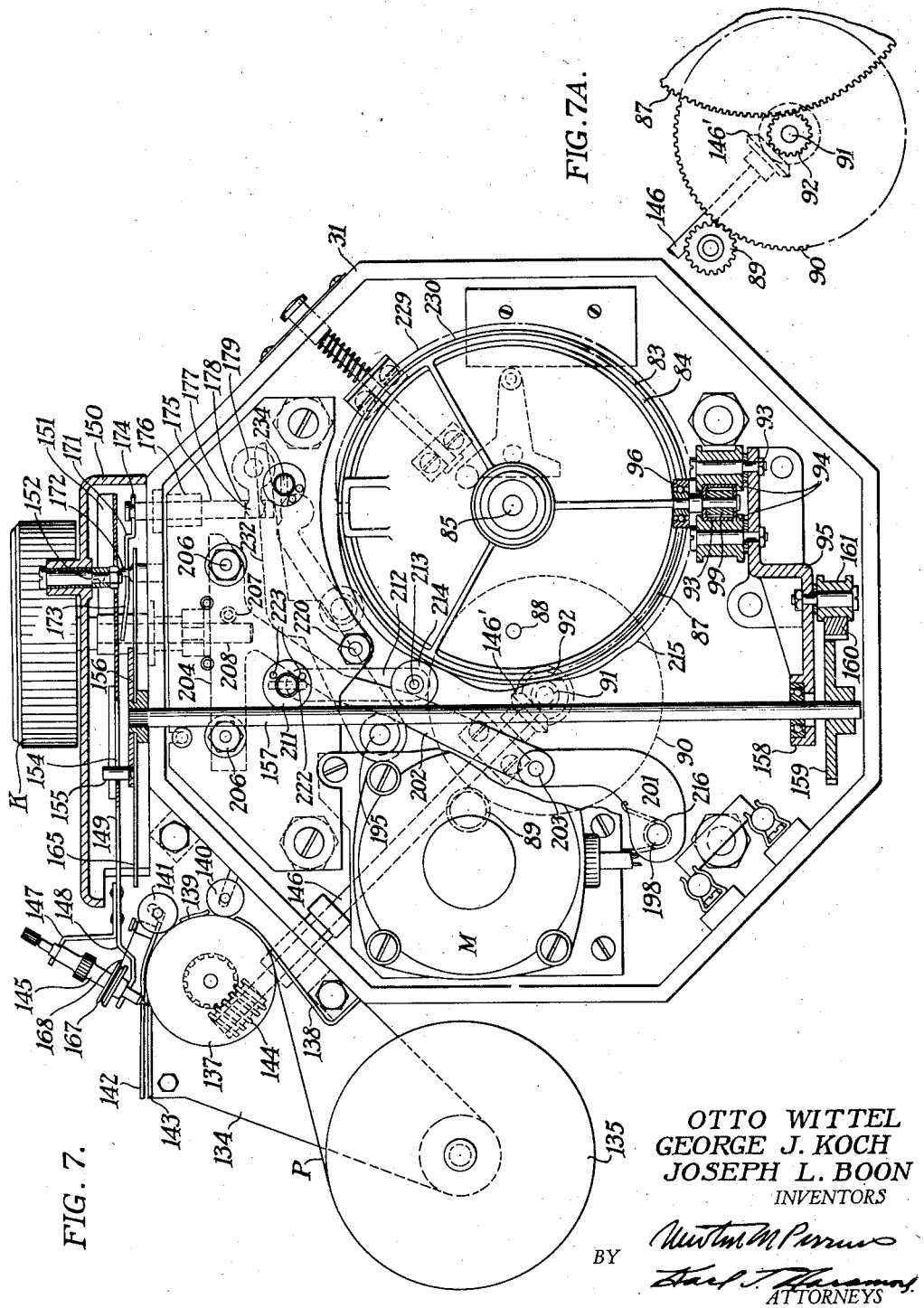
OTTO WITTEL
GEORGE J. KOCH
JOSEPH L. BOON
INVENTORS
BY
ATTORNEYS May 13, 1947.　　　　O. WITTEL ET AL　　　　2,420,633
INSTRUMENT FOR TESTING AND DEVELOPING THE STEREOPTIC
ACUITY OF A PERSON'S EYES
Filed Sept. 2, 1943　　　　15 Sheets-Sheet 7

OTTO WITTEL
GEORGE J. KOCH
JOSEPH L. BOON
INVENTORS

BY
ATTORNEYS

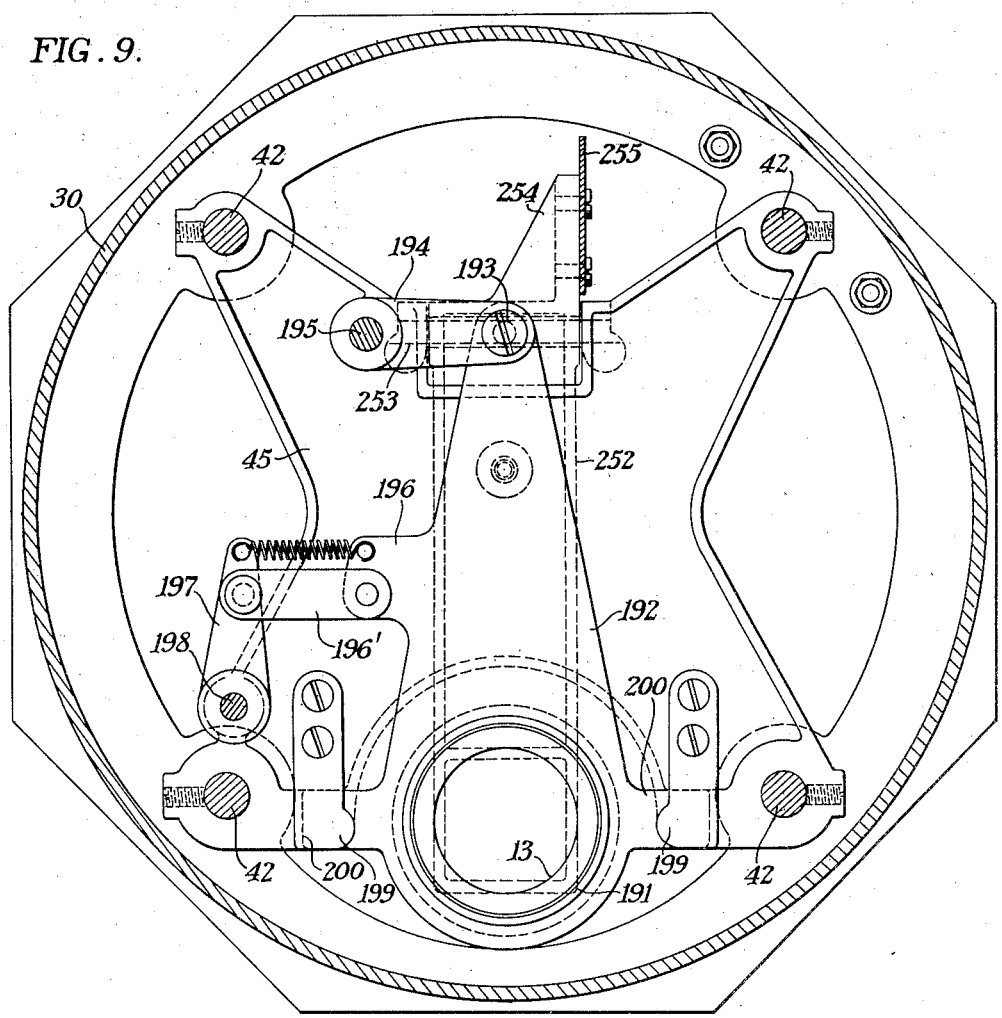

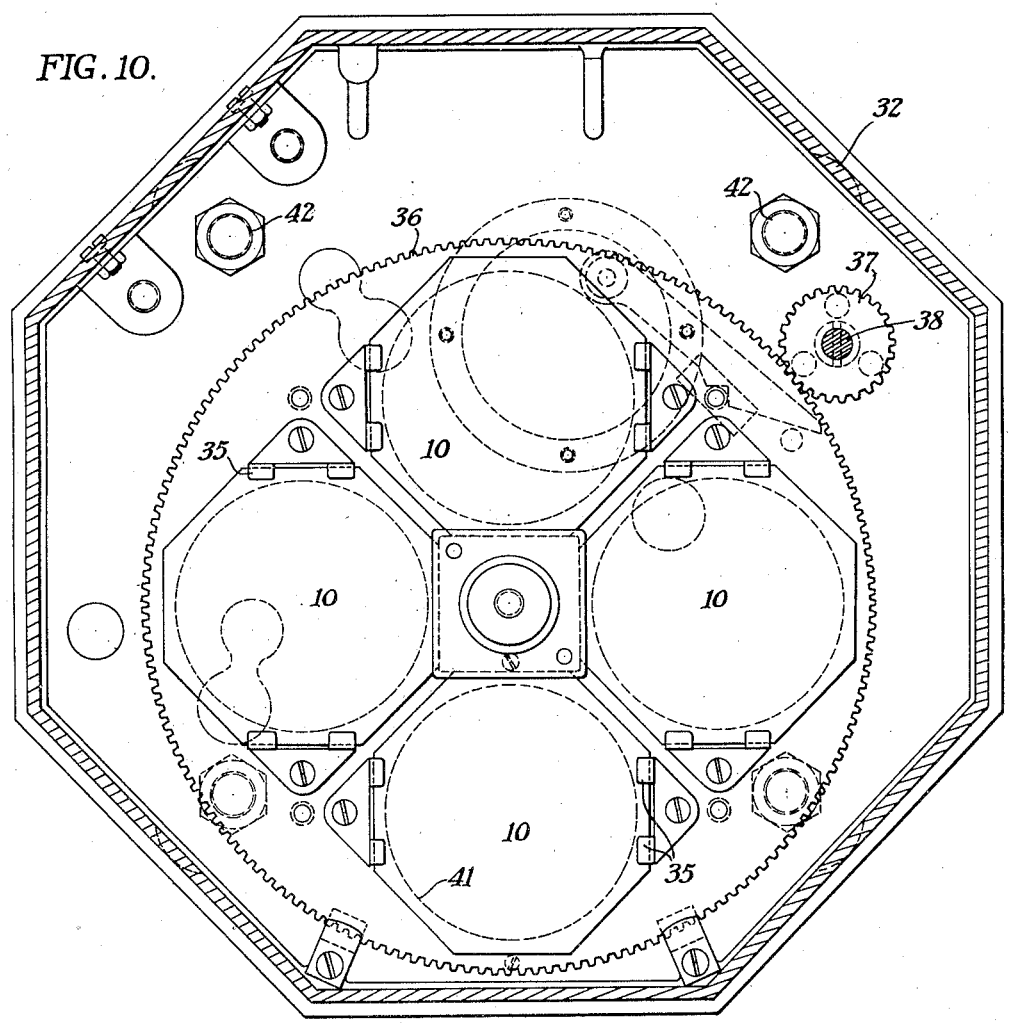

May 13, 1947.     O. WITTEL ET AL     2,420,633
INSTRUMENT FOR TESTING AND DEVELOPING THE STEREOPTIC
ACUITY OF A PERSON'S EYES
Filed Sept. 2, 1943     15 Sheets-Sheet 10
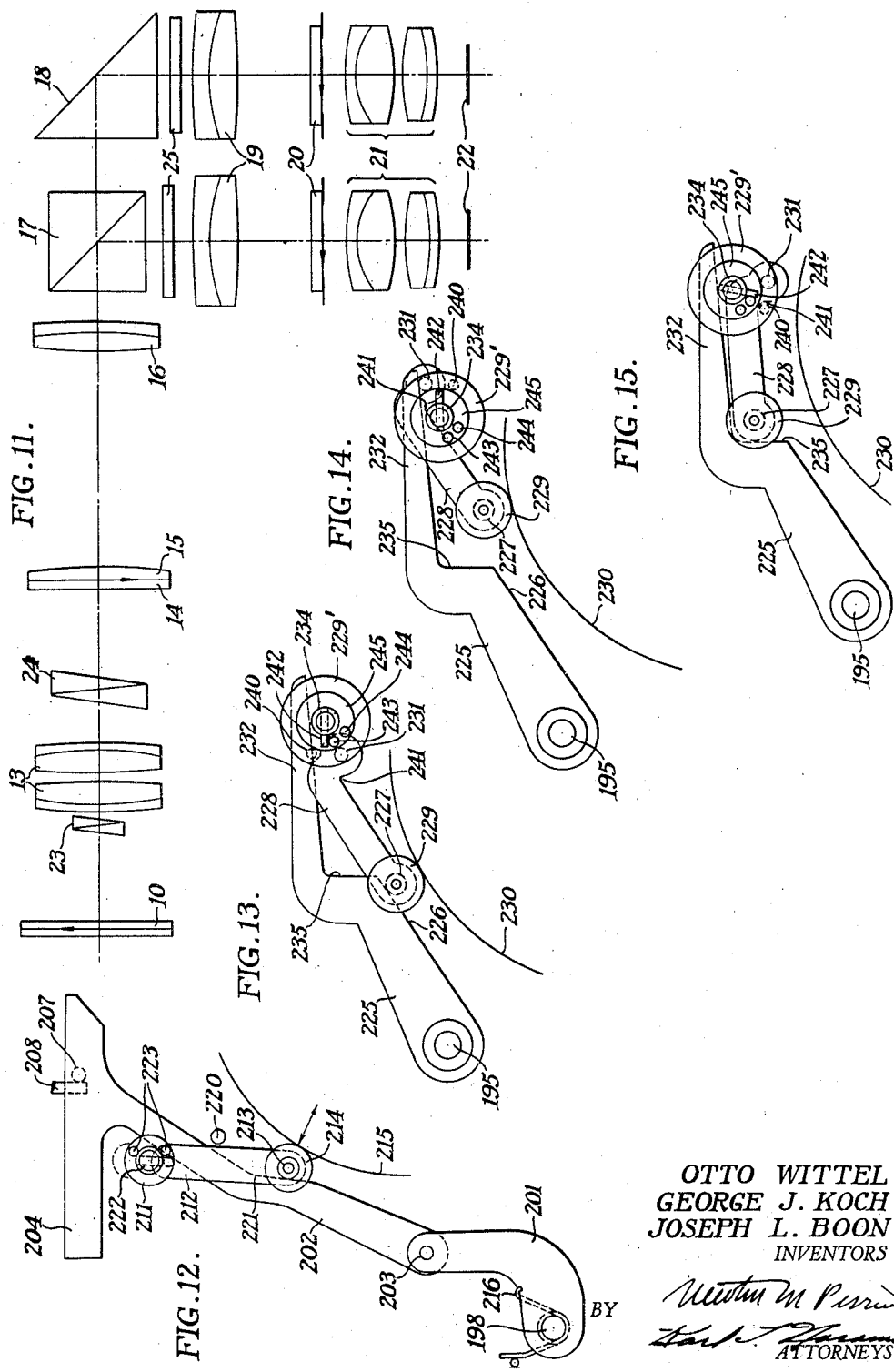
OTTO WITTEL
GEORGE J. KOCH
JOSEPH L. BOON
INVENTORS

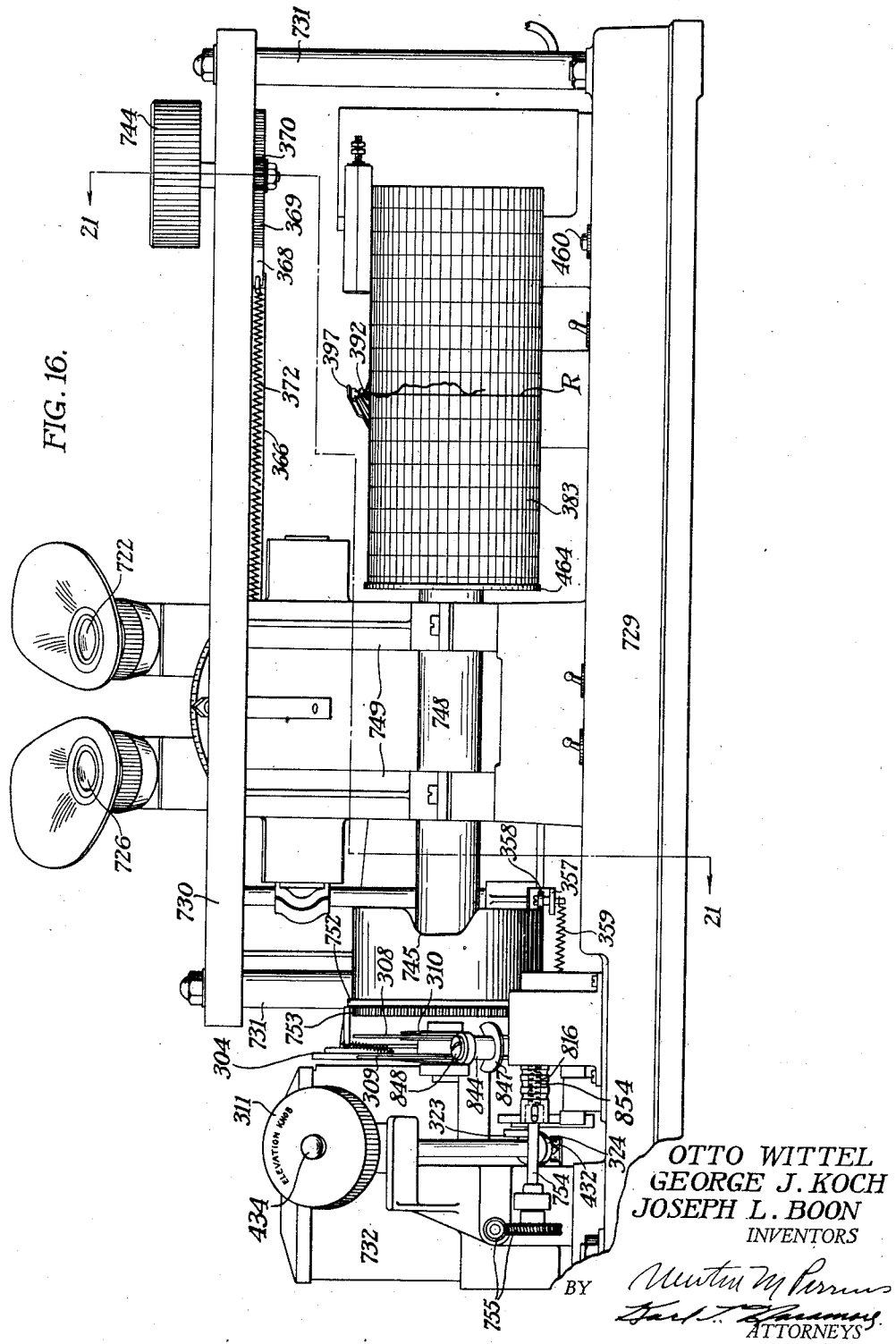

May 13, 1947.　　　　O. WITTEL ET AL　　　　2,420,633
INSTRUMENT FOR TESTING AND DEVELOPING THE STEREOPTIC
ACUITY OF A PERSON'S EYES
Filed Sept. 2, 1943　　　15 Sheets-Sheet 12
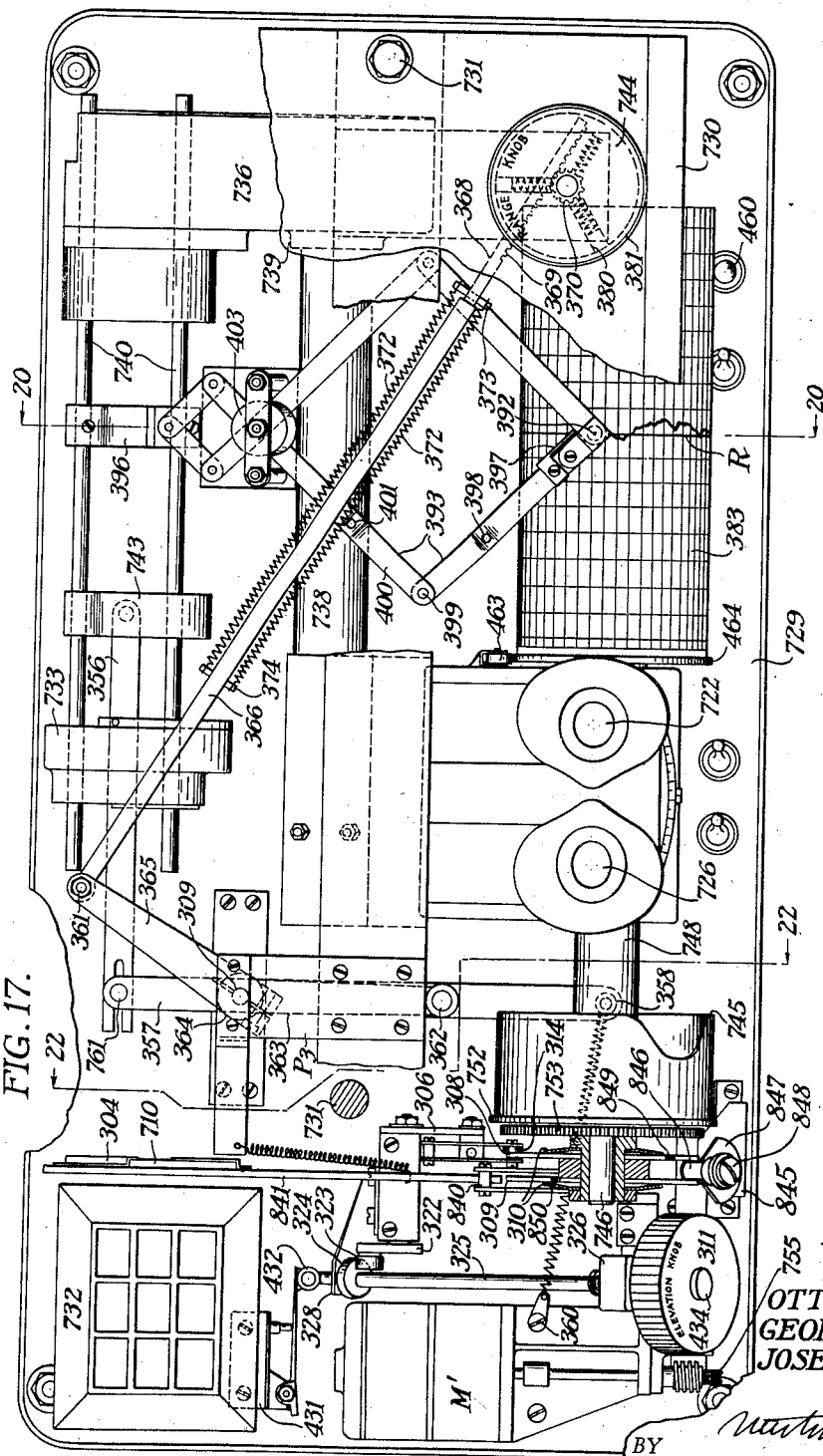
OTTO WITTEL
GEORGE J. KOCH
JOSEPH L. BOON
INVENTORS
BY
ATTORNEYS May 13, 1947.    O. WITTEL ET AL    2,420,633
INSTRUMENT FOR TESTING AND DEVELOPING THE STEREOPTIC
ACUITY OF A PERSON'S EYES
Filed Sept. 2, 1943    15 Sheets-Sheet 13
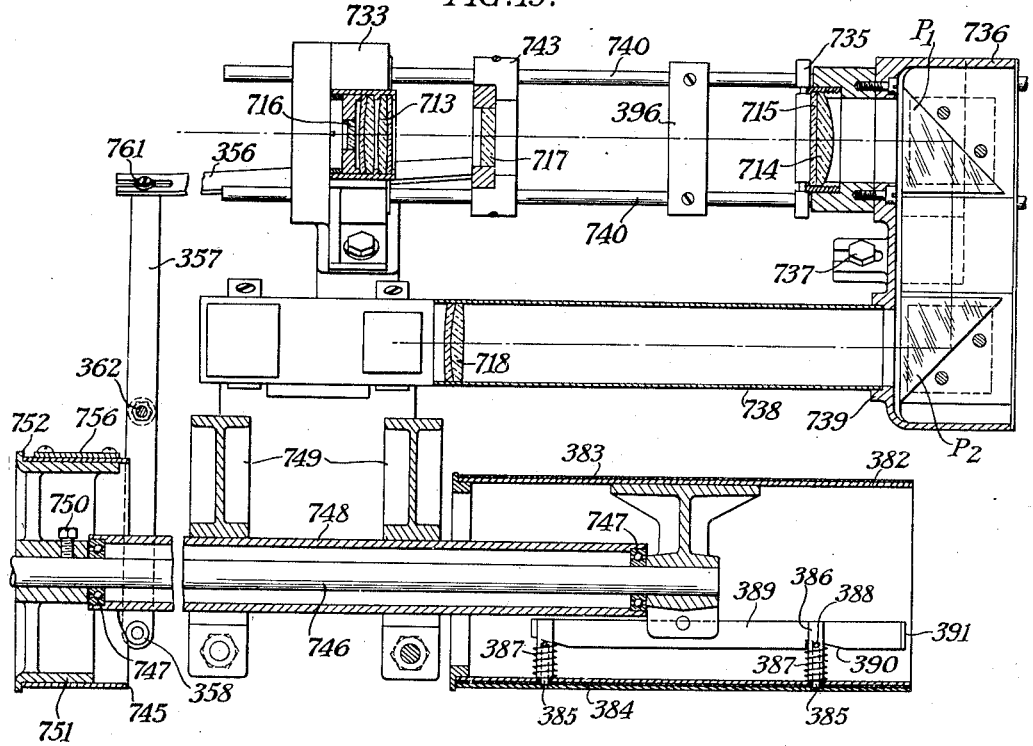
FIG. 19.
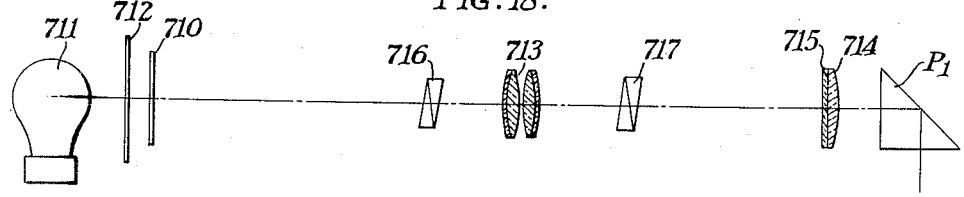
FIG. 18.
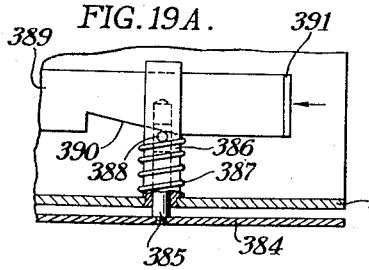
FIG. 19A.
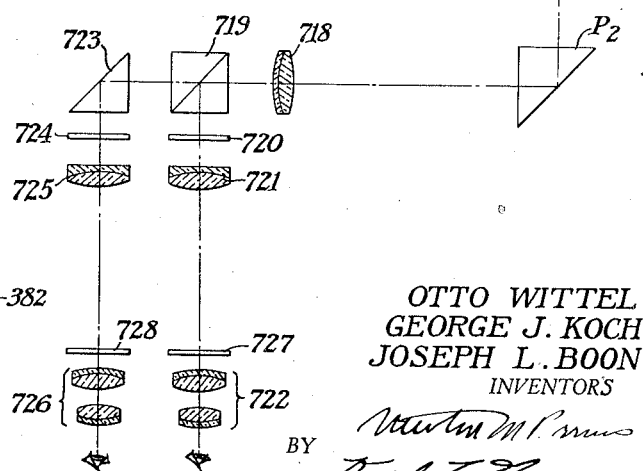
OTTO WITTEL
GEORGE J. KOCH
JOSEPH L. BOON
INVENTORS
BY
ATTORNEYS

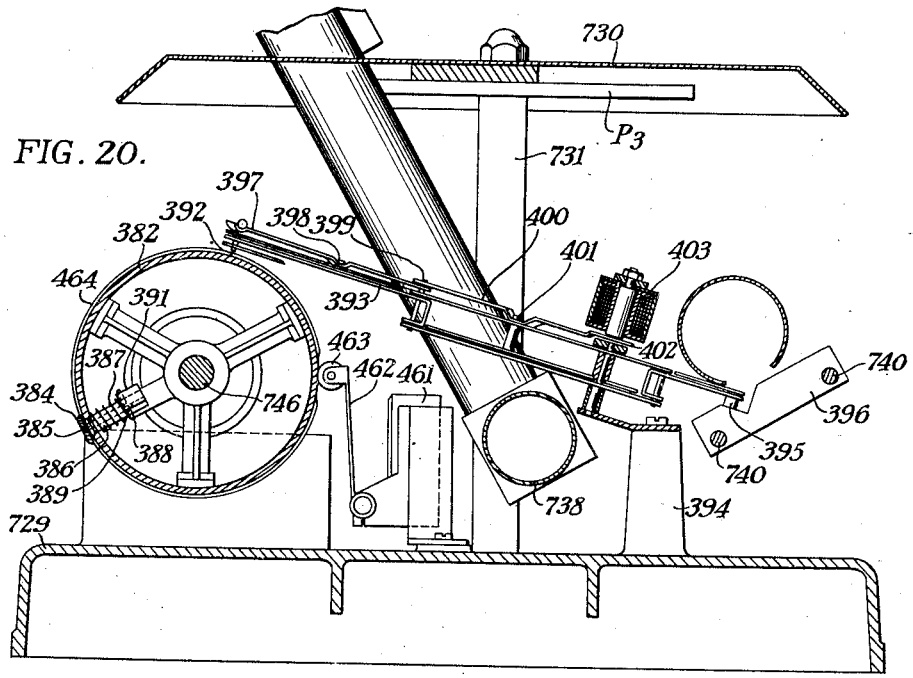
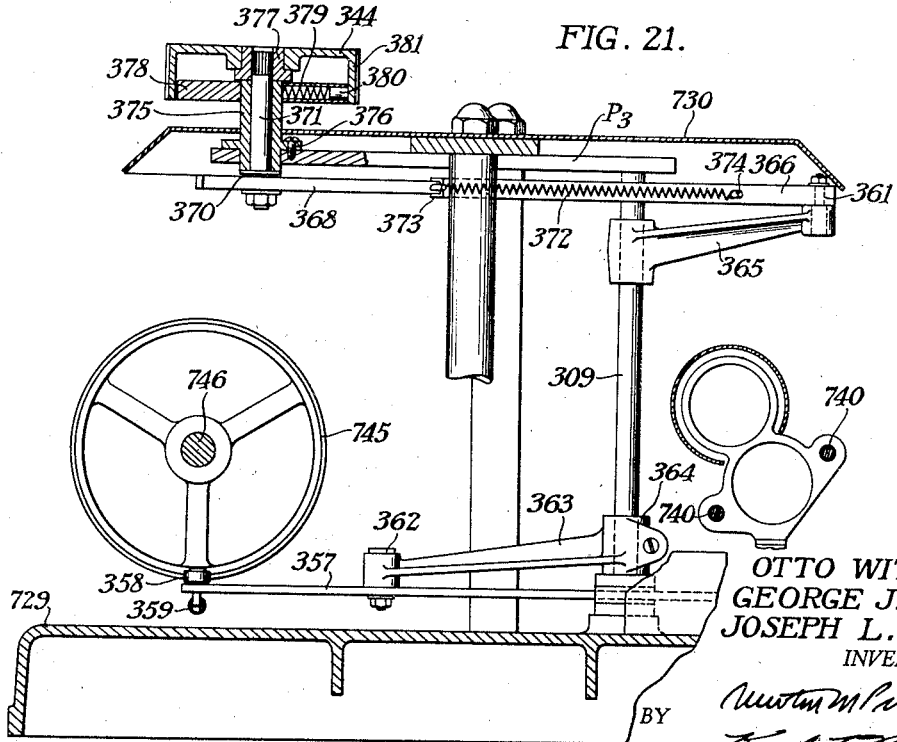

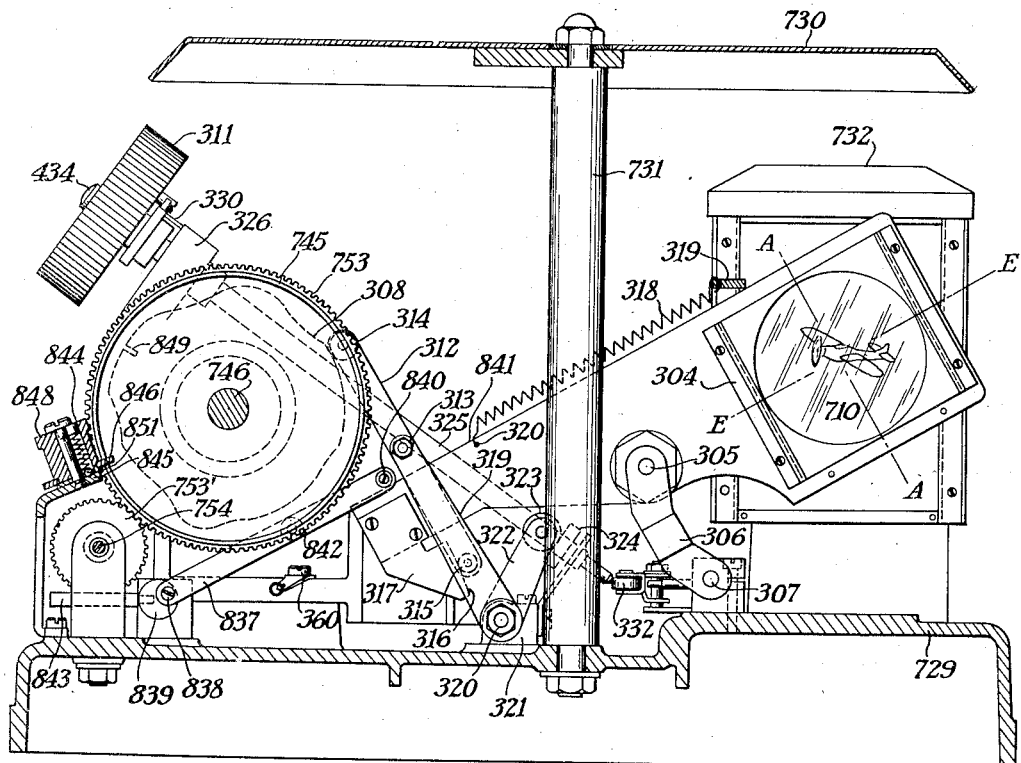
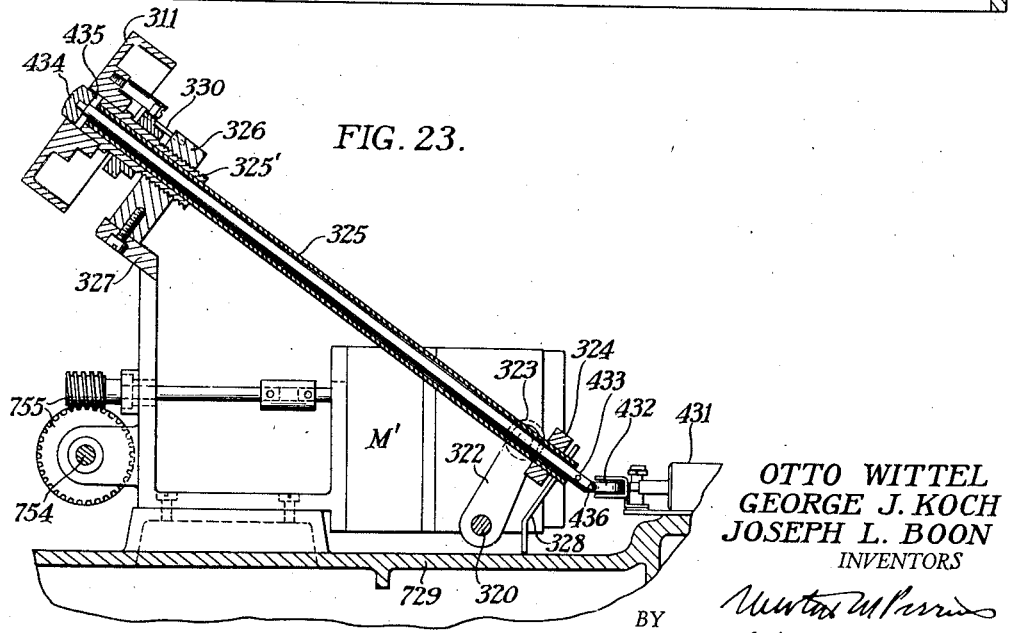

UNITED STATES PATENT OFFICE 2,420,633

INSTRUMENT FOR TESTING AND DEVELOPING THE STEREOPTIC ACUITY OF A PERSON'S EYES

Otto Wittel, George J. Koch, and Joseph L. Boon, Rochester, N. Y., assignors to Eastman Kodak Company, Rochester, N. Y., a corporation of New Jersey Application September 2, 1943, Serial No. 500,944

34 Claims. (Cl. 88—20)

The present invention relates to an instrument for testing and developing the stereoptic acuity of a person's eyes, and particularly to an instrument designed for use in the selection and training of operators for stereoscopic and coincident range finders.

All persons do not have normal stereoscopic vision, and in fact some people suffer from a complete absence of such vision. There are instances where persons having at least normal stereoscopic vision are required, and further there are instances in which it is desired that the normal stereoscopic vision of a person be developed to greater degrees in order to carry out a given job sufficiently well.

One instance particularly well suited to bring out this fact is the operation of stereoscopic and coincident range and height finders now being used by our armed forces. It is not only essential that the operators of instruments of this type possess satisfactory stereoscopic vision, but it is desirable, if not necessary, to exercise and develop the stereoscopic vision of a normal person to a greater degree to insure maximum efficiency. Furthermore, it is absolutely essential that the operators chosen for this job be completely trained in the handling and function of these instruments so that under fire they will be able to properly range upon the target in the fastest time, and smoothest manner, possible. Range finders as used in the field are very expensive and exceedingly complicated instruments so that it would be impractical to think of providing enough of such instruments merely for the training of raw recruits.

One object of the present invention is the provision of a "stereo trainer" (this term being used to designate an instrument for testing and developing a person's stereoscopic vision) for the use of testing and/or developing the stereoscopic vision of a person.

Another object is the provision of a stereo trainer for use in the selection and training of personnel for operating stereoscopic and coincident range finders.

And another object is the provision of a stereo trainer of the type set forth which is the same in operation and performance as a given range finder so that an operator can shift from the training instrument to a range finder without sensing any unfamiliarity as to function or operation of the latter.

And another object is the provision of a stereo trainer of the type set forth with which the operator sees a target moving over a prescribed course in range, elevation, and azimuth, in a field containing fixed reticle marks; and with which he can control the range and elevation of the target by means of two knobs which are similar in position and mechanical ratio to those of a given range finder.

And yet another object is the provision of a stereo trainer of the type set forth in which the range course of the target is varied automatically by shifting one of the elements of the optical system over a given path by a power-driven mechanism, and the elevation and azimuth tracking courses of the target are also varied by automatically shifting one of the optical elements, or the target, over a given path by a power-driven mechanism.

And another object is the provision of an instrument of the type set forth in which the operator can control the depth position of the target by adjustment of a range knob, and can control its elevation with respect to the reticle marks by an elevation knob, these controls being arranged to counteract the effectiveness of the automatic mechanism tending to vary the range and elevation of the target by manually shifting the optical element in opposition to the automatic mechanism, and/or manually altering the mechanical ratio of the automatic driving mechanism.

And still a further object is the provision of an instrument of the type set forth in which the arrangement of the automatic and manual controls for the range course and elevation tracking course is such that the operator cannot feel the movement of the optical element caused by the automatic mechanism, and which movement he is to continuously overcome in order to correct the range and elevation of the target.

And another object is to provide a trainer of the type set forth in which the accuracy with with the observer keeps the target in the plane of the principal reticle marks is recorded automatically and continuously on a sheet of moving chart paper.

And another object is the provision of a trainer of the type set forth in which interchangeable cams control the range course of the target, and the elevation and azimuth tracking courses, whereby the variations in range, elevation, and azimuth produced by any or all of these cams can be eliminated, even while the instrument is running, by manipulation of the proper release knobs.

Another object is the provision of a trainer of the type set forth in which two distinguishable images of the target are formed and viewed as stereo separations, and the separation of the images is varied by moving a range prism along the optical axis of the system to give an apparent change in depth of the target relative to a fixed reticle which is viewed binocularly.

And a further object is to continuously move said ranging prism by a power-driven cam to continuously vary the apparent depth position of the target, and to provide a manually controlled mechanism for moving the ranging prism independently of, and in opposition to, said cam so that the operator can compensate for the movement of the ranging prism by the cam in an effort to match the apparent depth position of the target with the reticle.

And yet another object is to provide independent power-operated and manually-operated drives for the ranging prism of the type set forth which are so arranged that the two can tend to move the ranging prism in the same or opposite directions at the same time, and the tendency of one drive will not affect the normal operation of the other; and the tendency of the power-operated drive to move the prism will not be transmitted to the manual control knob of the manual drive in any manner to signal the operator as to how he must adjust the manual control knob to overcome the effect of the cam drive on the range prism.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which:

Figure 1:
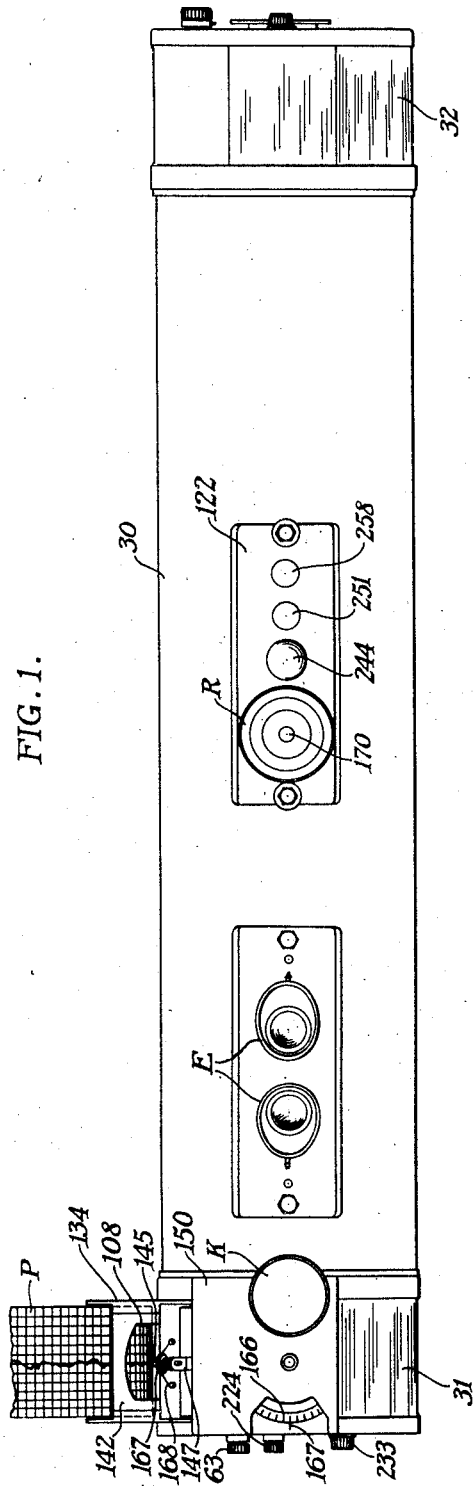
Fig. 1 is a top plan view, on reduced scale, of a "stereo trainer" constructed in accordance with a preferred embodiment of the present invention.
Figure 8:
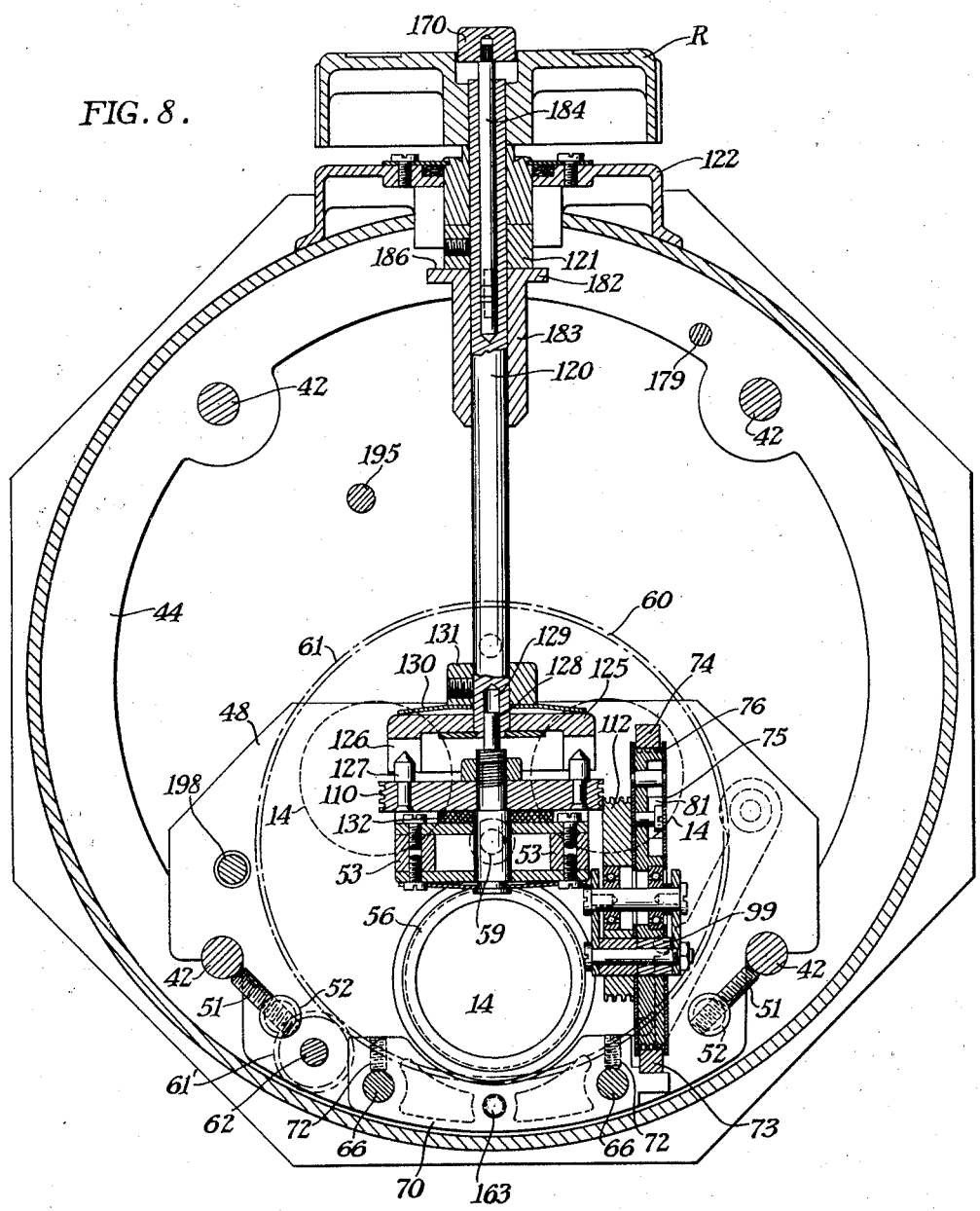

Figs. 4, 5, and 6 are elevational sectional views of successive portions of the trainer shown in Fig. 1, starting at the left and moving to the right according to the numbering, these figures when placed end to end, in order of their numbering, giving a complete sectional view of the trainer;

Fig. 5A is a top plan view of a portion of the instrument shown in Figs. 4 and 5;

Fig. 5B is a top plan view of a portion of the range prism carriage shown in Figs. 5 and 5A;

Fig. 7 is a transverse section of the trainer taken substantially on lines 7—7 of Fig. 4;

Fig. 7A is a fragmentary elevation of gears which are partially obscured in Fig. 7;

Fig. 8 is a transverse section of the trainer taken substantially on lines 8—8 of Fig. 5;

Fig. 9 is a transverse section of the trainer taken substantially on line 9—9 of Fig. 6;

Fig. 10 is a transverse section of the trainer taken substantially on line 10—10 of Fig. 6;

Fig. 11 is a diagrammatic showing of a preferred form of optical system used in the trainer shown in Fig. 1;

Fig. 12 is a detail, on enlarged scale, of a part of the driving linkage which controls the elevational tracking of the target, and showing the means for optionally disconnecting this linkage from the driving cam and providing complete manual control of the elevation position of the target;

Figs. 13, 14, and 15 are details, on enlarged scale, of a part of the azimuth tracking mechanism, and showing the manner of disconnecting the same from the power-driven control cam and assuming complete manual control of the azimuth position of the target;

Fig. 16 is a side elevational view of a stereo trainer constructed in accordance with another embodiment of the invention;

Fig. 17 is a top plan view of the trainer shown in Fig. 16 with the cover removed to show the internal mechanism;

Fig. 18 is a diagrammatic showing of the optical system used in this last-mentioned trainer;

Fig. 19 is a longitudinal section of the right-hand portion of the trainer shown in Fig. 17 with certain parts removed to clearly show how the optical elements of the system shown in Fig. 18 are mounted in the instrument;

Fig. 19A is an enlarged sectional detail showing the clamp for holding the chart paper on the recording drum in a released position;

Fig. 20 is a sectional view taken substantially on line 20—20 of Fig. 17 and showing the pantograph linkage for the recording stylus;

Fig. 21 is a composite sectional view taken at points spaced longitudinally of the instrument, as indicated by lines 21—21 of Fig. 16, and showing the complete range course adjusting linkage, including the power-driven cam and the manual range knob control;

Fig. 22 is a sectional view taken substantially on line 22—22 of Fig. 17, and showing the elevation and azimuth tracking mechanism for the target;

Fig. 23 is a sectional view similar to Fig. 22 with certain parts removed and with the elevational knob and its associated driving shaft shown in sections to clearly illustrate how said knob operates the differential linkage between the elevation cam and the target holder.

Like reference characters refer to corresponding parts throughout the drawings.

While the "stereo trainer" constituting the present invention is a research instrument primarily designed to further the study of problems related to stereoscopic range finders and range finder operation, the principles and mechanisms involved therein could just as readily be used by optometrists and oculists in their normal profession to test the stereoscopic vision of patients and to develop such a vision defective in this respect by training with such an instrument.

Essentially, the "stereo trainer" constituting the present invention is a binocular film viewer which simulates a given range or height finder used by the armed forces. When looking into the instrument, the operator sees a target (a ship or an airplane) moving over a prescribed course in range, elevation, and azimuth in a field containing fixed reticle marks. He can control the range and elevation of the target by means of two knobs, similar in position and mechanical ratio to those of the range or height finder in question. As the operator turns the range knob, a recording stylus makes a continuous graph of his deviation from the true-range position of the target. The graph paper is ruled from zero to 120 seconds on the time axis, and from minus 100 U. O. E. to plus 100 U. O. E. on the range axis. U. O. E stands for unit of error, and one U O. E. will correspond to a given error in seconds of arc in the eyepiece field of the range or height finder in question.

Interchangeable cams control the range course of the target, and the elevation and azimuth tracking courses. Variations in range, elevation, and azimuth produced by any or all of these cams can be eliminated while the instrument is running, by manipulation of the proper release knob. Haze can be simulated by means of a silk screen placed in the region between the target film and the projection lens. A wavy sheet of transparent material moved about in this region produces the effect of atmospheric convection currents. Real targets and real atmospheric conditions can be viewed if the film target is removed and an objective-mirror system is attached. The objective focuses real targets in the plane that normally contains the photographic target.

Stereoscopic vision requires vision with two eyes. The fact that each eye sees a different image of the same scene enables us to determine the relative distances of objects in space when both eyes are used and is fundamental to the "stereo trainer" constituting the present invention.

Referring now to Figs. 1–15 inclusive, a "stereo trainer" constructed in accordance with a preferred embodiment of the present invention will be described. The principle of the instrument will be readily understood from an examination and explanation of the optical layout thereof shown in Fig. 11. The target slide 10, diffusely illuminated by a projection lamp 11 and diffusing screen 12 (see Fig. 6) is imaged by an objective 13, at unit magnification, in the plane of the reticle 14 near the field lens 15.

For a moment let us omit consideration of the Wollaston prisms and polarizing filters in the system. The reticle marks are opaque and thus appear as black lines superimposed on the target image. The light from this target image is rendered parallel by the collimating lens 16 and is split into two similar beams by the beam splitter 17 and right-angle prism 18 which in turn direct the beam into two separate telescopes. Each telescope includes an objective 19, a reticle 20, an eye lens 21, and an exit pupil 22. The objectives 19 form an image of the target and reticle 14 on the reticles 20 of the telescopes where they are so observed in superposed relation by the eye lenses. The observer's eyes are positioned properly relative to the exit pupil of the telescope by eyepieces E (Fig. 1) which surround and shield the eye lenses of the telescopes.

Thus far we have no stereoscopic effect. Each eye sees exactly the same view and, hence, there is no depth apparent in the scene. To obtain the stereoscopic effect it is necessary to provide two separate target images and view them as stereo separations. While there are a number of ways that this can be done, in order to provide a simple and compact instrument, we have accomplished this by the combined use of Wollaston prisms and polarizing filters, as will now be set forth. Normally, light vibrates in all directions. After it is polarized it vibrates in one direction only. When a polarizing filter is used for viewing an image formed by polarized light, all of the polarized light will be transmitted when the filter is at the proper angle. However, if the filter is rotated through 90 degrees, the beam will be entirely extinguished.

In the present instrument, polarization is accomplished by Wollaston prisms which at the same time separate the beam into two component images, a left-eye image and a right-eye image, of the target, which are polarized at right angles one to the other. Referring to Fig. 11, a fixed Wollaston prism 23 is placed between the slide 10 and the objective 13, and a ranging Wollaston prism 24 is positioned between the objective and the principal reticle 14 to move along the optical axis to and from the fixed prism. The beam is divided by the beam splitter 17 so that a left-eye image and a right-eye image, still oppositely polarized, are directed to each telescope. Each telescope includes a polarizing filter 25, which are so oriented that one eye sees only one of the target images, and the other eye sees only the second.

The fixed Wollaston prism splits the beam from the target slide so that two target images are formed slightly displaced from each other and oppositely polarized. The ranging Wollaston prism (hereinafter referred to only as the range prism) tends to reconvert the two beams emerging from the fixed prism. By moving the range prism along the axis of the system, the two oppositely polarized target images can be made to approach each other, coincide, or even cross over, in the plane of the principal reticle. Then, the relative lateral movement of the two images, caused by the sliding of the range prism, results in an apparent movement in depth of the stereoscopically fused target image. If the range prism is adjusted so that the two images appear to be identically spaced with respect to the principal reticle marks, the target will appear to be at the same distance as the reticle. If the range prism is adjusted to form the left-eye image of the target to the left of the right-eye image, the target will seem to be behind the reticle. And if the left-eye image is displaced to the right, the target will appear to be in front of the reticle. When using the instrument the range prism is continuously moved back and forth relative to the fixed prism by a motor-driven cam, and the observer attempts to keep the target image at exactly the same distance as the principal reticle marks by manually adjusting the range prism. He does this by turning the range knob R on top on the instrument, see Figs. 1 and 5.

Figure 3:
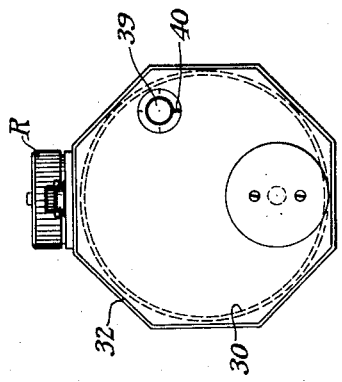
Fig. 3 is an end elevation of the right end of the trainer with respect to Fig. 1.
Figure 2:
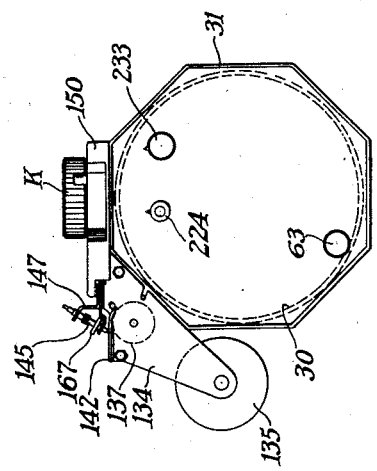
Fig. 2 is an end elevation of the left end of the trainer with respect to Fig. 1.

As shown in Figs. 1, 2, and 3, the instrument as a whole comprises an elongated tubular section 30 to either end of which is detachably connected an octagonal head 31 and 32. The instrument in outward appearance resembles a range, or height, finder used by our armed forces, and the adjusting knobs forming a part thereof are placed and operate in the same manner as those on the finder in question, so that a person trained with this instrument is able to operate a conventional range, or height, finder with no trouble at all.

Figs. 4–6 are elevational sectional views of the three successive portions of the complete instrument shown in Fig. 1, on an enlarged scale, and when placed end to end in the order of their numbering will show the complete instrument. Therefore, any optical element depicted in Fig. 11 can be located on the instrument itself with the aid of Figs. 4–6. As clearly illustrated in these figures, the lamp 11, diffusing disk 12, and target slide 10, are mounted in the octagonal head 32 attached to the right end of the tube 30, looking at Fig. 1. In the head 32, a turret 33 is rotatably mounted on the stubshaft 34 to which four target slides 10, or three target slides and a field lens, are adapted to be mounted in circumferential spaced relation on the turret by means of clips 35. The periphery of the turret 33 is provided with gear teeth 36 so that the turret in effect constitutes a large spur gear. In mesh with the gear on the turret is a pinion 37 fixed to a rotatable shaft 38 extending longitudinally of the head 32 and operatively connected with an adjusting knob 39 extending beyond the end face of the instrument, and by means of which the turret can be manually rotated. The adjusting knob includes an indicator 40 which cooperates with an index scale on the end face of the head 32 to indicate to the operator when any one of the targets carried by the turret is in alignment with the window 41 in the base of the head 32, see Figs. 1 and 6.

The head 31 is held onto one end of the tube 30 by four tie rods 42 in rectangular spaced relation and extending at one end through a base 43 in the head 31, and being fixed at the other end in a ring 44 telescoping with the right end of the tube. The tie rods 42, in addition to serving to hold the left-hand head 31 on the tube in assembled relation, also serve to support all of the mechanism within the tubular part of the instrument. As shown in Figs. 6 and 9, a supporting bracket 45 slidably engages the tie rods at four corners, and in addition to serving as means for holding the tie rods in spaced relation, this bracket acts as a support for the fixed Wollaston prism 23 and the objective 13, as will be set forth hereinafter.

The range prism is supported on a movable carriage so that it can be moved back and forth along the optical axis relative to the fixed prism, and the mounting for the range prism will now be described. As shown in Figs. 4, 5, 5A, 5B, and 8, five supporting plates 46, 47, 48, 49, and 50 are set on the two bottom tie rods 42 in spaced relation longitudinally of the instrument and are held against vertical movement relative thereto by setscrews 51, threaded into a pair of spacer bars 52 extending through plates 46, 47, and 48. The top of the plates 46, 47, and 48 are supported vertically in spaced relation by a second pair of spacer bars 53. The plates 46 and 47 are held in proper spaced relation by spacing bushings 54 and 55 on spacer bars 52; while the plates 47 and 48 are held in proper spaced relation by shoulders on the spacer bars themselves. The field lens 15 is supported in a mount 56 fixed in the plate 48, see Fig. 5. The plates 49 and 50 are held in spaced relation by bushings 57 and 58, the former being mounted on a shaft 59 to one end of which is fixed a turret 60 carrying two or more principal reticles 14 in circumferential spaced relation, see Fig. 8. The reticle turret 60 has gear teeth 61 formed around its periphery and with which a pinion 61', see Fig. 8, is adapted to mesh. The pinion 61' is fixed to the end of a reticle shaft 62 extending thru the left head 31 of the instrument and being controlled by a reticle knob 63 on the outside of the end face of the head. By means of this reticle knob the reticle turret can be rotated to bring any one of the reticles thereon into alignment with the optical axis.

Between each pair of supporting plates 46 and 47 and 49 and 50 are situated a pair of horizontally spaced bushings 64 including ball races 65, see Figs. 4, 5, and 5A. Slidably mounted in these bushings on the ball races are two horizontally spaced rods 66 to the right-hand end of which is fixed a mount 67 in which the range prism 24 is mounted, see Figs. 5, 6, and 8. The movable carriage for the range prism therefore comprises the two slidable rods 66 and the prism mount 67 carrying the prism and connecting the two rods together.

In accordance with a preferred embodiment of the present invention, through a differential cable and pulley system, this movable carriage can be driven along the optical axis by either the range knob R or by a motor-driven range cam. When the trainer is in operation and the range knob is not turned, the carriage is moved by the range cam; the target thus appears to move in depth with respect to the reticle marks on reticle 14. By turning the range knob R, however, the operator can compensate for the motion caused by the range cam, thereby attempting to keep the range prism in the stereoscopic coincident position. The degree of accuracy with which the operator does this, is observed on a unit dial by the instructor and is recorded on a length of chart paper during a given length of run.

The differential cable and pulley system for moving the range prism by a motor-driven cam and by means of the range knob will now be described. Referring to Figs. 5, 5A, 5B, and 8, a pair of bridges 70 and 71 are fixed to the movable rods 66 by setscrews 72, in spaced relation longitudinally of the instrument. Fastened to, and extending between, these bridges is a square rail 73 which moves along with the rod 66. Rotatably mounted on and between the movable rail 73 and a second stationary rail 74, extending between the two plates 47 and 48, is a vertically disposed flanged pulley 75 having its periphery provided with a spiral groove 76. A cable 77 is wrapped completely around the pulley 75 and has one end fastened to one end of the rail 73 by a bolt 78 and has its other end fastened to the other end of the rail 73 by a bolt 79. The intermediate portion of the cable 77 passes around an eccentric 80 and a spring member 81, both mounted in a cut-out in the face of the pulley, see Figs. 5 and 8, the eccentric serving as an adjustment to make the cable taut and the spring member serving to keep it in driving contact with the pulley at all times.

It will thus be appreciated that the pulley 75 is free to roll along the rails 73 and 74, and in so rolling will cause the rail 73 to move to the left when rolling clockwise, and will cause the rail to move to the right when rolling counterclockwise, looking at Fig. 5. Movement of the rail 73 causes movement of the range prism along the optical axis by virtue of the connection between the rail 73 and the range prism carriage; and it is in this manner that the motor-driven cam is adapted to cause a continuous variation in the range of the target. As shown in Fig. 4, the range cam 83, formed into a cylinder from a flat sheet of metal, is mounted on a drum 84 which is rotatably mounted on the shaft 85 extending horizontally through, and journaled in, boss 86 formed in the base 43 of the head 31. The drum 84 is connected to a large spur gear 87, also rotatably mounted on shaft 85, by a pin 88 extending horizontally from the gear through an opening in the base of the drum. This spur gear 87 is driven by the motor M through a reduction gearing comprising a pinion 89 directly geared to the drive shaft of the motor and which in turn drives a spur gear 90 fixed to a driven shaft 91 carrying a pinion 92 which engages the spur gear 87, see Figs. 7 and 7A.

The connection between the range cam 83 and the pulley 75 for moving the range prism over a prescribed course will now be set forth. Referring to Figs. 4, 5, 5A, 5B, and 7, a rectangular tube 93, extending longitudinally of the instrument near the bottom thereof from the head 31 towards the center of the tube 30, is mounted adjacent to the end of the head between a pair of flanged rollers 94, which are in turn mounted on a bracket 95 fixed to the base 43 of the head, to be capable of longitudinal movement. This rectangular tube carries a roller 96 at one end which is adapted to engage the range cam 83. The rectangular tube 83 has a clip 97 attached thereto, and a tension spring 98 connected between the clip and supporting plate 46 normally pulls the tube to the right to hold the roller 96 thereon against the range cam. Telescoping with the rectangular tube 93 is a bar 99 connected to the axle of the pulley 75 by a forked bracket 100. The rectangular tube 93 is flexibly connected to the bar 99 by a tension spring 101 connected between the left-hand end of the bar and a pin 102 fixed to, and extending through, the left-hand end of the rectangular tube 93, said tension spring lying wholly within the tube, see Fig. 4. The end of the rectangular tube 93 is normally held against a stop pin 103 on the bar 99 by the tension in the spring 101 so that when the tube is moving to the right the connection between the tube and bar will be positive, tending to move the axle of the pulley to the right. When the rectangular tube is moved to the left by the range cam, movement of the bar 99 in this direction will depend upon the resilient coupling provided by the spring 101. This flexible coupling between the rectangular tube 93 and the bar 99 telescoping therewith, is necessary to account for cases in which the operator, in manipulating the range knob R tends to inadvertently move the range prism carriage beyond either of the limits of the cam driving mechanism therefor, as will be readily appreciated from the following description of the manual drive for the range prism.

To sum up the cam drive for the range prism, the range cam continually causes the axle of the pulley 75 to be reciprocated longitudinally of the instrument over a prescribed path, and this movement of the axle causes the pulley to be rotated, by virtue of its rolling contact with the stationary rail 74, in opposite directions depending upon the direction of movement of the axle. As the pulley 75 rotates counter-clockwise, the cable 77 wrapped therearound will cause the rail 73, and the range prism carriage connected thereto, to move to the right. And, vice versa, if the pulley 75 is rotated clockwise, by the axle thereof being moved to the right, the rail 73 and the range prism carriage will be moved to the left. As a result, the range cam is continually acting to move the range prism first in one direction and then in the other relative to the position to the stereoscopic coincidence to vary the apparent range of the target.

In using this instrument, the operator attempts to keep the range prism in the stereoscopic coincident position by compensating for the motion of the range prism caused by range cam by manipulation of the range knob R. The drive connection between the range knob R and the range prism carriage to allow for such manual compensation of the range drive will now be described.

Referring to Figs. 5, 5A, and 5B, a drive pulley 110 having a spiral groove, and an idler pulley 111, are mounted in a horizontal position at opposite sides of the drive pulley 75 on spacer bars 53. On the inside face of pulley 75 there is fixedly mounted another pulley 112 having a spiral groove, this pulley being smaller than pulley 75 and disposed in a vertical plane parallel thereto. A cable 113 has one end fixed to a tie bolt 114 on the pulley 110, makes approximately a 180-degree wrap of the pulley, extends around the idler pulley 111, then after several turns around the pulley 112 extends back to the pulley 110 where its other end is attached to a second tie bolt 115. The idler pulley 111 is slidably mounted on the spacer bars 53 and is normally moved to the left, looking at Fig. 5, by a spring 116 for the purpose of keeping the cable 113 taut at all times. Thus, by turning the drive pulley 110 in opposite directions, the pulley 75 can be rotated in either direction on the rails 73 and 74 through the pulley 112 fixed to the face thereof. Accordingly, the pulley 75 can be rotated independently of the cam drive by rotating the drive pulley 110 to provide a manual adjustment of the range prism. It also follows that if the drive pulley 110 is continuously rotated in the proper direction and at the proper speed when the cam drive is working, the rail 73, and the range prism connected thereto, can be held stationary. By virtue of this fact, the cam drive for the range prism can be compensated for by rotation of the pulley 110 in the proper direction and at the proper speed, depending upon the pitch of the cam, and the range prism can be brought into, and constantly held in, the stereoscopic coincident position.

The pulley 110 is connected to the manual range knob R for manual manipulation in the following manner. The range knob R is fixed to one end of a shaft 120 journaled in a boss 121 carried by the control plate 122 fixed to the outside of the tube 30 by bolts 123 in covering relation with an opening 124 in the wall of the tube. Rotatably mounted on the end of the shaft 120 is an annular clutch member 125 having diametrically spaced slots 126 which are adapted to receive a pair of drive pins 127 extending above, and diametrically disposed on the top face of the drive pulley 110. This particular clutch arrangement is used to permit the range knob and its associated shaft 120 to be assembled onto, or disassembled from, the instrument by merely dropping the control plate 122 onto the tube 30, or removing it therefrom, respectively. The lower end of the shaft 120 is properly located and supported by the sliding engagement between a vertical locating pin 128, extending from the axle of the drive pulley 110, and a bore 129 in the end of the shaft.

The actual drive connection between the range knob R and the drive pulley 110 constitutes a friction clutch in the form of a resilient friction pad 130 which is held between a collar 131, fixed to the shaft by a setscrew, and the top surface of the annular clutch member 125. This resilient friction pad constitutes the actual drive connection because, as pointed out above, the clutch member 125 is rotatably mounted on the shaft 120 and is connected to the shaft only through the friction clutch arrangement. As shown in Fig. 5, the resilient friction pad 130 normally tends to raise the shaft 120 and the range knob R connected thereto vertically relative to the pulley 119, the bore 129 in the end of the shaft 120 and the slots 129 in the clutch member 125, being deep enough to permit this relative movement. Accordingly, when the shaft 120 is raised by the resiliency in the friction pad 133, the friction between the pad and the clutch member 125 is so slight that the range knob R is not rotated when the cam-driving mechanism is operated to move the range prism. Another advantage of this friction clutch connection is that it, in combination with a friction pad 132 between the drive pulley 119 and its mounting, prevents the operator from being able to feel, through the range knob, the drive induced on the pulley 75 by the cam drive, the operator thereby getting an indication as to which way he is to turn the knob in order to compensate for the cam drive.

The degree of accuracy with which the operator compensates for the motion of the range prism caused by the range cam, and keeps the range prism in the stereoscopic coincident position, is recorded on a length of chart paper during a given length of run, usually one revolution of the range cam. Referring to Figs. 1, 4, and 7, the recording mechanism comprises a supply roll 133 of chart paper P mounted between a pair of arms 134 fixed to one inclined side of the head 31 of the instrument. The paper is fed from the supply roll to a driven feed roll 137 in surface contact with which it is firmly held by a plurality of resilient spring fingers 138 and 139 and guide rollers 140 and 141. After making about a 180-degree wrap with the feed roller 137, the paper is fed through a guideway formed by two separated plates 142 and 143 extending substantially tangent to the feed roll. The paper is fed from the supply roll and out of the guideway by a rotation of the feed roll itself, which is driven by a worm and wheel combination 144 from the motor-driven shaft 91 by a bevel gear combination 146' on shaft 146 extending from the head 31 at an angle, see Fig. 7. The chart paper is, therefore, fed in a given timed relation to the rotation of the range cam, because they are both geared to the same motor drive shaft 91.

A continuous record is adapted to be made on the moving chart paper by a recording stylus 145 which is supported at an angle above the feed drum and is normally held in contact with the paper moving thereover. The stylus which may be of any form, such as a pencil, a pen, or a pointed instrument if a special chart paper is used, extends through an opening 183 in the top guide plate 142 to engage the paper, see Fig. 1. By way of example, the stylus has been shown as a pencil of the mechanical type rotatably supported in arms 147 and 148 on the end of a strip 149 extending across the top of the head 31, and between the top of the head and a mechanism cover 150 attached to the top of the head. The strip 149 is provided, adjacent its right end, with a pair of spaced ears 151 which engage pivot pins 152 extending horizontally from a post 153 supported by the cover 150, see Figs. 4 and 7. The strip is thus free to swing vertically and horizontally about this pivot point, and since the pivot point is adjacent to the right end of the strip, the weight of the stylus tends to swing the strip downwardly and keep the stylus in contact with the surface of the feed roll 137.

The stylus supporting strip 149 is provided with an elongated slot 154 extending lengthwise thereof and through which a pin 155 eccentrically mounted on a disk 156 is adapted to extend. This disk is fixedly attached to the upper end of a vertical shaft 157 extending from above the top and to the bottom of the head 31 where it is journaled in a bearing 158 carried by the bracket 95. To the extreme lower end of the shaft 157 is connected a spur gear 159 which meshes with a rack 160 movable longitudinally of the head and guided by a roller 161, see Figs. 4 and 7, supported by the bracket 95. This rack is pinned at 162 to the end of a rod 163 connected at its other end to the bridge 71 of the range prism carriage. Therefore, as the range prism carriage is moved, the rack 160 is moved therewith and the shaft 157 is in turn oscillated through the spur gear 159. Oscillation of the shaft 157 causes the eccentric pin 155 on the disk 156 to oscillate the stylus transversely of the chart paper leaving a zig-zag continuous trace on the paper of the type shown in Fig. 1. Parts of the recording apparatus are adjusted so that when the range prism is in the stereoscopic coincident position the stylus will rest on a central index line running longitudinally of the chart paper. As the range prism moves to opposite sides of the stereoscopic coincident position, the stylus will move to the right and left of the center reference line on the chart paper, and a continuous zig-zag line will be formed on the chart, the amplitude of which will depend upon the amount the range prism is removed from the stereoscopic coincident position. The chart paper is provided with a plurality of parallel lines spaced from the center reference line and calibrated in plus and minus U. O. E. units (units of error) the sign depending upon which side of the stereoscopic coincident position the range prism is on at any particular instant. Thus, the recording apparatus continuously plots ranging errors directly in units of error, one U. O. E. equaling a given number of seconds of arc at the eye (i. e., 12 seconds of arc).

For direct observation by the instructor, an indicator disk 165 is fixed to the shaft 157 directly below the disk 156 to rotate with the shaft. This indicator disk is viewed through a window 166 in the cover 150, see Figs. 1 and 4, and bears a scale marked in plus and minus U. O. E. which cooperates with an index mark 167 at the edge of the window. Thus, by observing the indicator disk through the window 166 the instructor can tell at any and all times how accurately the operator is keeping the range prism in the stereoscopic coincident position, the chart recording being obtained for purposes of permanent record. The point on the recording pencil is automatically kept sharp by virtue of a pulley 167 and cord 168 arrangement, shown in Fig. 7, which causes the pencil point to be rolled on the paper as the result of the oscillating movement thereof over the chart paper. This mechanism, as well as the mechanism for oscillating the stylus transversely of the chart paper, is fully disclosed in U. S. patent application, Serial No. 481,311, filed March 31, 1943, in the name of Otto Wittel, and to which application reference can be had for a more complete disclosure of this arrangement.

Frequently, tests are to be made in which the observer attempts to adjust his range setting with special care at certain specified instants. A button 170 in the center of the range knob R permits the observer to indicate points at which he thinks he has made a particularly accurate setting. When the button is pressed, the recording stylus is lifted from the paper; the resulting interruptions in the continuous trace identifying these places. The stylus-lifting mechanism comprises a finger 171 pivoted intermediate its ends on a tapered shoulder of a post 172, and having one end 173 underlying the stylus supporting strip 149 to the left of its pivot point, and having its other end 174 connected to a vertical post 175 slidably mounted in a boss 176 in the top wall of the head 31, see Fig. 7. For pulling down on this post 175 to raise the recording stylus, a ball-ended arm 177, engaging the socket 178 in the post, is connected to an oscillatible shaft 179 extending longitudinally of the instrument having one end journaled in a boss in the base 43 of the head 31, the other end thereof being journaled in the bracket 180 carried by one of the tie rods 42, see Fig. 5. The right-hand end of the shaft 179 carries a roller bearing arm 181, the roller on which underlies a flange 182 on a sleeve 183 slidably mounted on the shaft 129 to which the range knob is attached. This sleeve is connected to a shaft 184, on the end of which the button 170 is fixed and which is slidably mounted in a bore 185 in the shaft 129, by a pin 186 extending through a slot 187 in the shaft 129. The actuating button for raising the stylus from the chart paper is located in the center of the range knob so that it can be operated without necessitating the removal of the hand from the range knob.

From the above description, it will be clear that the range cam 83, when in operation, continuously tends to move the range prism over a predescribed course on either side of the stereoscopic coincident position, and that by virtue of the differential pulley system the operator can manually compensate for the cam drive and hold the prism in the stereoscopic coincident position. The cam has two extreme limits of movement, but if the operator inadvertently turns the range knob in the wrong direction after the rectangular tube 93, driven by the cam, has reached one of these limits, he will tend to rotate the pulley 75 in the direction which will carry the axle thereof beyond the limit of the cam drive. The flexible coupling (spring 101) between the rectangular tube 93 and the bar 99 telescoping therewith takes care of this contingency and assures that no damaging strain will be placed on the differential pulley drive by an inadvertent error on the part of the operator in manipulating the range knob. The bar 99 is limited as to movement to the right, looking at Figs. 4, 5, and 7, by the stop pin 103 coming against the left-hand face of the supporting plate 47, and is limited in its movement to the left by the stop pin 108 thereon coming against the right-hand face of the supporting plate 47. A pair of bumper springs 189 and 190 are fixed, in encircling relation, to each of the rods 66, forming a part of the range prism carriage, to alternately engage the supporting plates 48 and 47, respectively, when the carriage approaches one or the other of its limits of movement, and thereby cushion the stopping of the carriage rather than letting the stop pins 103 and 108 come up against the faces of the supporting plate 47 with a sharp impact.

Elevation and azimuth tracking errors are simulated in this instrument by apparent motion of the target in its own plane. These motions are provided by moving the principal objective 13 at right angles to the optical axis of the system, moving it horizontally for elevation tracking errors, and vertically for azimuth tracking errors.

To obtain the necessary movements of the objective 13 relative to the optical axis to simulate these tracking errors, the objective 13 is fixed in a mount 191 carried by a supporting plate 192 of the shape best shown in Fig. 9. One end of this plate, vertically disposed above the objective, is pivoted at 193 an an arm 194 fixed to an azimuth rod 195 extending longitudinally of the instrument and being rotatably supported at spaced points therealong. By rotating the azimuth rod 195 the plate 192 and the objective 13 carried thereby is moved vertically relative to the optical axis of the system. To a horizontal extension 196 on the supporting plate 192 is pivoted one end of a link 196' which is pivoted at its other end to an arm 197 fixed to the elevation rod 198. The elevation rod extends longitudinally of the instrument 30 in parallel relation to the azimuth rod 195, and is rotatably mounted at spaced points along its length. By oscillating the elevation rod 198, the supporting plate 192 and the objective 13 carried thereby can be moved horizontally of the optical axis to provide elevation tracking errors. The particular manner in which the supporting plate 192 is mounted permits of the objective 13 being adjusted horizontally and vertically at the same time or at separate times. A pair of guide fingers 199 mounted on the supporting bracket 45 in spaced relation thereto are adapted to overhang projections 200 on the supporting plate 192 to confine the movement of the free end thereof to a plane at right angles to the optical axis of the instrument.

The elevation rod 198 is adapted to be continuously oscillated by a cam-driven mechanism to simulate elevation tracking errors in the target, and this mechanism will now be set forth. Referring to Figs. 4, 7, and 12, to the end of the elevation rod 198 extending into the head 31 of the instrument is fixed a J-shaped lever 201. A substantially T-shaped lever 202 is pivoted at one end 203 to the lever 201 and the upper cross arm 204 thereof is slidably guided by a guide plate 205 spaced from the base 43 of the head 31 by bolts 206. Fixed to the cross arm 204 of the lever 202 is a horizontally extending pin 207 which is engaged by a vertically disposed pin 208 eccentrically mounted on a disk 209 fixed to the end of the shaft 210 to which the elevation knob K is connected, said knob extending above the cover 159 on the top of the head 31, see Figs. 4 and 7.

Pivotally mounted eccentrically of a collar 211 is one end of a strap 212 through the other end of which extends a pin 213 on one end of which is mounted a roller 214. The stem of the lever 202 bears against the pin 213, and when the strap 212 is in its lowermost position, shown in full lines in Figs. 7 and 12, the roller 214 is pressed against the elevation cam 215 by the combined action of the spring 216 tending to rotate the J-shaped lever 201 clockwise and the weight of the T-shaped lever 202 pivoted thereto. The elevation cam is located on the shaft 85 behind the range cam 83, and is pinned to the spur gear 87 by the same pin 88 which connects the range cam to the spur gear. Accordingly, the elevation cam is rotated at the same time and speed as the range cam.

Referring now particularly to Figs. 7 and 12, it will be observed that the roller 214 is moved in the direction of the double arrow (Fig. 12) by the combined action of the spring 216 and the elevation cam. If the pin 208 controlled by the elevation knob K is stationary, as it will be if the elevation knob K is held stationary, pin 207 on the lever 202 becomes the fulcrum point for the lever, and the end thereof pivoted at 203 to the lever 201 swings and causes an oscillation of the elevation rod 198 and a consequent horizontal movement of the objective 13. If, however, the pin 207 is allowed, or caused, to move at the proper speed and in the same direction of movement as the lever 202 caused by elevation cam, then the pivoted end 203 of the lever will not tend to swing, and the elevation rod will remain stationary despite the dictates of the elevation cam. The position of the pin 207 on the lever 202 is controlled by the rotation of the elevation knob K because the pin 208 eccentrically connected thereto can be moved in one direction to permit the pin 207 to move at a desired speed, or can be made to move the pin 207 in the other direction at a desired speed. Therefore, by rotating the elevation knob K in the proper direction and at the proper speed, the effect of the elevation cam on the elevation rod 198 can be compensated for the purpose of correcting the elevation error in the target.

By examining Fig. 12, it will be understood that if the pin 207 is moved relative to the pin 213 following the cam, that then the pin 213 becomes the fulcrum for the lever 202 and the pivoted end 203 thereof can be swung to oscillate the elevation rod 198. Accordingly, since the elevation knob K controls the movement of the pin 207, said knob can be used to manually adjust the elevation of the target when the elevation cam is ineffective as well as when the cam is effective. No recording is made of the elevation position of the target with respect to the center of the field because the proper elevation position is only necessary to facilitate the proper ranging of the target.

It is sometimes desirable to stop the elevation tracking motion, and this can be done by rotating the collar 211 through approximately 180 degrees, thereby pulling the strap 212 upwardly, to the dotted line position shown in Fig. 12, so the roller 214 is removed from engagement with the elevation cam. In this raised position, one edge of the strap 212 comes to rest against an adjustable stop pin 220 so that the pin 213 can still act as a fulcrum for the lever 202 and the elevation position of the target can be manually adjusted by the elevation knob K. The stem of the lever 202 is provided with an inclined offset portion 221 so that when the pin 213 is moved from its lower position to its upper position the final angular position of the pivot point 213 relative to the axis of the elevation rod 198 will be the same. For instance, assuming that the instant it is desired to stop elevation tracking motion the roller 214 is on the pitch circle of the elevation cam and the target is, therefore, in the center of the field; after the strap 212 is raised to stop tracking motion, the pin 213 in the raised position will support the lever 202 in such a position that the target will still be in the center of the field, although in moving between the lowered and the raised position the elevation rod will have been oscillated to vary the elevation of the target. The "in" and "out" position of the elevation tracking mechanism is determined by the engagement of a radial pin 222 on the collar 211 with two diametrically spaced stop pins 223. Rotation of the collar 211 is controlled by a control knob 224 on the end of the head 31.

As set forth above, the azimuth position of the target is varied by oscillating the azimuth rod 195, and the tracking mechanism for doing this will now be described. To the end of the azimuth rod 195 extending into the head 31 is fixed an arm 225 of the shape best shown in Figs. 7 and 13–15. When the azimuth tracking mechanism is operative, the lower inclined edge 226 of this arm rests upon a pin 227 carried by, and extending from, one side of the end of a link 228. Rotatably mounted on the opposite side of the link is a roller 229 which rides on the azimuth cam 230 which is also mounted on the shaft 85 between the elevation cam 215 and gear 87 and is pinned to the spur gear 87 by the same pin 88 as the other cams. The link 228 is pivoted eccentrically of one face of a rotatable disk 229' by a pin 231 extending laterally of the disk beyond the plane of the nose 232 of the arm 225.

When the parts are in the position shown in Figs. 7 and 13, the roller 229 is in contact with the azimuth cam 230, and the rises and depressions in the cam will cause the arm 225 to continuously swing in opposite directions and oscillate the azimuth rod, which will in turn cause the objective 13 to move vertically of the optical axis and vary the azimuth position of the target in the field. There is no manual correction for azimuth tracking errors, because this error is usually taken care of by second operator in the manipulation of range and height-finding instruments.

It is ofttimes desirable to eliminate azimuth tracking error when beginners are using the instruments, but at the same time be able to manually adjust the azimuth position of the target to the center of the field. This is done in the present instrument by manually rotating the disk 229 clockwise between the positions shown in Figs. 13 and 14. Rotation of the disk 229 is done by manipulation of the control knob 233 extending to the outside of the end face of the head 31 and connected to the disk by a shaft 234.

When the disk 229 is rotated clockwise from the position shown in Fig. 13, the link 228 is drawn longitudinally until the pin 227 on the end thereof leaves the edge 226 of the arm 225 and comes opposite the cut-out 235 of the arm. In this position, the roller 229 still rests on the cam and is free to be moved up and down thereby, but this has no effect upon the azimuth position of the target, because the pin 227 is no longer in engagement with the arm 225. After the disk 229 is moved clockwise about 30 degrees from the position shown in Fig. 13, the pin 231 engages the lower end of the nose 232, and in moving from there to the position shown in Fig. 14, assumes control of the arm 225 and causes the same to swing and rotate the azimuth rod. Therefore, in this range of movement, the azimuth position of the target is under complete manual control.

So that roller 229 can be raised from the azimuth cam completely when so desired, the pin 240 is mounted on the face of the disk 229' to which the link 228 is pivoted, so that it extends axially of the disk and across the plane of the link. When the disk 229 is turned clockwise to the position shown in Fig. 15, this pin engages the crook 241 in the link 228 and raises the link from the azimuth cam, the pin 227, coaxial with the roller 229, then lying in the cutout 235 of the arm 225. The disk 229 is capable of about one complete revolution and its two extreme limits of movement are positively determined by the engagement of a stop pin 242 extending radially of shaft 234, with one or the other of two fixed stop pins 243 and 244 extending axially of a boss 245 fixed to the supporting plate 205 and acting as a journal for the shaft, see Figs. 4 and 13–15.

The instrument includes other refinements which are more or less incidental to the present invention and which will be mentioned only in a general way. When a target slide that simulates night conditions is used, the reticle marks on the principal reticle cannot be seen. In order to make them visible, an illumination system is provided for the principal reticle which comprises a tube 246 extending vertically from the control cover 122 into the tube 30 directly above the principal reticle, see Fig. 5. Into this tube is adapted to be slid a second tube bearing a lamp 247, the rays of which are converged onto the reticle from the side by a lens 248 carried at the end of the tube 246. The lamp-bearing tube is adapted to be closed by a cap 249 extending above the control plate. The reticle lamp is controlled by a switch 250 which is operated by a rotatable knob 251 extending above the control plate 122. This switch includes a rheostat by means of which the brightness of the lamp can be varied.

In initially adjusting the instrument, it may be necessary to vary the position of the fixed Wollaston prism 23 slightly along the optical axis of the system. To accomplish this a so-called internal adjuster is provided which comprises mounting the fixed prism 23 in one end of a hanger 252, and which hanger includes a pair of transversely extending pins 253 which are rotatably supported in a bearing 254, carried by the supporting brace 45, see Fig. 6. By virtue of this mounting, the lower end of the hanger, and therefore the fixed prism, is capable of moving in an arc longitudinally of the tube 30, as indicated by the double arrow in Fig. 6, and inasmuch as only a very limited movement of the fixed prism is ever required, the movement, although in reality an arc, for all practical purposes, can be considered as straight-line movement along the optical axis. To the extreme upper end of the hanger 252 is fixed a bar 255 extending horizontally and longitudinally of the tube 30, see Figs. 5 and 6. The free end of this bar carries a transverse pin 256 which engages the profile of a cam 257 connected to a rotatable adjusting knob 258 extending above the control plate 122. The pin 256 is normally held against the cam 257 by the action of a compression spring 259, mounted between the head of a bolt 260 extending from the supporting brace 45 and through a hole in the hanger 252 and the hanger itself, which tends to swing the hanger and bar clockwise. By turning the adjusting knob 258, the fixed prism can be adjusted along the optical axis of the system as desired. This internal adjuster for the system is used primarily to be sure that the target image and the reticle marks appear at the same range when the recording stylus is on the zero, or reference, line of the chart paper.

In Figs. 16-23 a "stereo trainer" constructed in accordance with a second embodiment of the present invention is shown. The principle of operation of this embodiment is essentially the same as that of the preferred embodiment above described, the difference in the two being primarily in the mechanical drive for simulating a continuous variation in the range and elevational tracking of the target, and the mechanism for manually counteracting such variation to keep the target in a given position of range and elevation in the field of view.

The principle of the instrument constructed in accordance with the second embodiment of the invention will be readily understood from an examination and explanation of the optical lay-out thereof shown in Fig. 18. As shown, the target slide 710, diffusely illuminated by the projection lamp 711 and diffusing screen 712, is imaged by the objective 713, at unit magnification, in the plane of the combined field lens 714 and principal reticle 715, the latter of which contains the principal reticle marks. Two target images are formed in this plane as before, because between the target slide and the principal reticle there are two Wollaston prisms: a fixed prism 716 that divides the projection beam into two beams diverging from each other, and a range prism 717 that reconverges the two beams. These beams are polarized in mutually perpendicular planes by their passage through the Wollaston prisms. After each scene is focused at the principal reticle 715 it is deflected through 180° by two right-angle prisms $P_1$ and $P_2$. The light, diverging from the principal reticle 715, is then rendered parallel by the collimator lens 718, and is split by the beam-splitter 719 into two beams, each containing both target images. One of these beams is deflected through a polarizing filter 720 into the right-eye telescope, including an objective 721 and eyepiece 722, while the other passes on to the left-eye prism 723 and is deflected through the other polarizing filter 724 into the left-eye telescope, including an objective 725 and eyepiece 726. The two images are viewed, together with the reticle marks, by means of the telescope objectives and eyepieces. The polarizing filters are oriented in such a way that each eye sees only one of the images. Therefore, the apparent depth position of the target with respect to the reticle marks is determined by the horizontal separation of the two target images at the principal reticle. Separation of the images is governed by the motion of the range prism 717 along the projection apparatus as in the first embodiment. Depth reticles 727 and 728 may be provided in the telescopes to help orient the observer stereoptically, and these are made so that they appear spaced symmetrically ahead of, and behind, the marks on the principal reticle.

Figs. 16 and 17 are a front elevation and top plan, respectively, of the complete instrument constructed in accordance with the second embodiment of the present invention, and Fig. 19 shows the mechanical lay-out of the optical parts shown in Fig. 18 and described above. Therefore, any optical element depicted in Fig. 18 can be located on the instrument itself with the aid of Figs. 16, 17, and 18. As clearly illustrated in these figures, the instrument includes a base 729 and a cover 730 supported thereon, and spaced therefrom, by a plurality of vertical posts 731. The lamp 711 is mounted in a lamphouse 732 at one corner of the base and the fixed prism 716, objective 713, principal reticle 715 and field lens 714 are supported in brackets 733 and 735, respectively, fixedly mounted on the base 729. The two reflecting prisms $P_1$ and $P_2$ are mounted in a housing 736 which is adjustably mounted on the base by any suitable adjustable mount, indicated at 737, so that they can be adjusted relative to the optical axis of the other elements to properly align the system. The beam-splitter 719, the reflecting prism 723, and the collimator lens 718 are all carried by a tube 738, the end of which is adapted to telescope with a flange 739 carried by the housing 736, in alignment with the exit face of the reflecting prism $P_2$ to enclose this part of the optical system from extraneous light, see Fig. 19.

The ranging Wollaston prism 717 is mounted on a movable carriage to be capable of movement along the optical axis, and the carriage comprises a pair of spaced parallel rods 740 which are slidably supported by the brackets 733 and 735. These two rods are connected together by a member 743 which also serves as a mount for the ranging prism 717, see Fig. 19. Through a novel differential lever system, this carriage can be driven along the projection axis by either the range knob 744 or the motor-driven range cam 745. When the trainer is in operation and the range knob is not turned, the carriage is moved over a course prescribed by the cam 745, and the target appears to move in depth with respect to the reticle marks on the principal reticle 715, as set forth above in connection with the first-described embodiment of the invention. By turning the range knob 744, however, the operator can compensate for the motion caused by the range cam 745, thereby always keeping the range prism in the stereoscopic coincident position and, therefore, keeping the target in the plane of the reticle marks.

This differential lever system for moving the ranging prism constitutes the major mechanical difference between the two embodiments of trainers, and will now be described in detail. The motor-driven shaft 746 is mounted on the instrument by being supported at spaced points in roller-bearing 747 carried by a tube 748 which is in turn supported in cradle 749 fixed to the base 729 of the instrument, see Figs. 16 and 19. Connected to the end of the shaft 746, by a set-screw 750, is a drum 751 on the flanged end 752 of which is fastened a gear 753. This gear is adapted to be driven by a gear 753', carried by a shaft 754 which is driven by a worm wheel and worm, indicated at 755, connection from a motor M' mounted on the base. The range cam 745 consists of a thin sheet of brass, or the like material, wrapped around the surface of the drum 751 in abutment with the flanged end 752 thereof and held in wrapped relation with the drum, and in overhanging relation with the end thereof, by a holding clip 756, see Fig. 19. A cam of this type is easily cut and mounted on the drum.

The lever system for moving the range prism 717 along the optical axis in the course prescribed by the range cam 745 includes a link 356 pivoted at one end to the movable carriage 743, and pivotally connected at the other end to a lever 357 extending substantially transversely of the base 729, see Figs. 17, 19, and 21. The lever 357 has a roller 358 on its other end which is normally held in engagement with the range cam 745 by a spring 359 connected at one end to the lever and at the other end to a stud 360 on the base 729. The connection between the end of the lever 357 and the link 356 is an adjustable one as indicated at 761 to permit a relative adjustment of these two members to be sure that the ranging prism 717 is in the stereoscopic coincident position when the roller on the lever 357 is in a position determined by the pitch circle of the cam. The lever 357 is pivoted intermediate its end on a floating pivot 362, see Figs. 17 and 21, which is adapted to be moved transversely of the lever by rotation of the range knob to alter the mechanical advantage of the system as will be fully described hereinafter.

The pivot 362 is rotatably carried by one end of an arm 363, the other end 364 of which surrounds and is fixed to a vertical post 369 rotatably mounted on the base 729 and a supporting plate P3 spaced below and parallel to the cover 730, see Fig. 21. A second arm 365, vertically disposed above said first arm, is clamped at one end to said post and at the other end is pivotally connected to the end of a rectangular hollow shaft 366, the pivotal connection between the arm 365 and the shaft 366 providing a free coupling 361. Telescoping with the hollow shaft 366 is a rectangular bar 368 having a rack 369 formed on one face thereof which is in engagement with a pinion 370 fixed to the supporting shaft 371 for the range knob 744. The connection between the hollow shaft 366 and the bar 368 is a flexible one, and comprises a pair of tension springs 372 connected at one end to a pin 374 extending through the shaft and connected at the other end to a pin 373 extending through the bar.

By virtue of this differential lever system between the ranging prism, the range cam and the range knob, it is possible to move the range prism manually independently of the range cam drive to overcome the movement of the prism resulting from the range cam, or to completely counteract the effect of the range cam, as the case may be, in order to maintain the range prism in the stereoscopic coincident position so that the target as seen through the eyepiece will appear to be matched with, or have the same depth position as, the reticle marks. In order to make this clearly understood we will analyze the lever system to bring out the independence and the interconnection between the parts thereof operated by the range cam and the parts thereof operated by the range knob. Looking at Figs. 16 and 19 first, and considering only the lever system between the range cam 745 and the range prism 717, since the lever 357 fulcrums about pivot 362 intermediate its ends, as the range cam 745 tends to move the end of the lever engaging it coounterclockwise, the other end of the lever 357 will also move counterclockwise and tend to move the range prism 717 to the left. And vice versa, if the lever 357 pivots clockwise about the pivot 362, as it will when a depression in the cam comes opposite the roller 358, then the range prism is moved to the right. These movements, of course, depend upon the pivot point 362 being stationary, or at least the extent of such movements do.

It will be understood that if the pivot 362 is moved in the same direction as the contour of the cam 745 dictates the lever 357 will not swing about this point as its fulcrum, and, therefore, the cam will not cause the movement of the range prism. Furthermore, if the end of the lever 357 engaging the cam is considered stationary, as it would be if the cam were not rotating or if the roller 358 was engaging a dwell on the cam, then if the pivot 362 is swung back and forth the end of the lever 357 connected to the range cam 717 will be moved back and forth, the cam-engaging end of the lever acting as a fulcrum for the lever. Accordingly, by shifting the pivot 362 the effectiveness of the cam on the lever 357 to move the range prism can be annulled or counteracted, as the case may be, and since the position of the pivot 362 is controlled by the range knob 744, the operator is able to keep the range prism in its stereoscopic coincident position despite the normal tendency of the range cam 745 to continuously move the prism to and from this position. The flexible connection between the range knob 744 and the pivot 362 prevents the instrument from being damaged should the operator inadvertently tend to move the range prism, or the parts connected thereto, beyond one of their extreme positions.

So that the range knob 744 will not be rotated when the lever 357 is oscillated by the range cam 745, and so that the operator cannot feel the driving tendency of the range cam, and thereby have an indication of the direction he must turn the range knob to overcome the driving tendency of the cam on the range prism, the range knob 744 is frictionally mounted as will now be described. Referring to Figs. 17 and 21, the range knob shaft 371 is journaled in a bearing 375 fixed to the plate P₃ by a screw 376. The range knob 744 proper is frictionally connected to a collar 377 which has a drive fit with the end of the shaft 372, as shown. A disk 378 fixed to the bearing 375 includes three spaced radially extending bores 379 in each of which is slidably mounted a friction pad 380 normally spring pressed into engagement with the inside face of the downwardly descending flange 381 on the range finder knob. The friction imposed by these three pads is sufficient to overcome the friction between the knob and the collar 377 when the hand is not on the knob, but can be overcome when the knob is grabbed by the hand to assume control, and the friction between the knob and the collar 377 is thereby increased.

The degree of accuracy with which the operator keeps the range prism in the stereoscopic coincident position is recorded on a sheet of chart paper on a recording drum as will now be described. Mounted on the end of the drive shaft 746 is a recording drum 382 which is open at the right end, see Fig. 19, and on the surface of which is adapted to be held a sheet of chart paper 383 of the type best shown in Fig. 17. The chart paper is wrapped around the drum and the two ends thereof, which do not meet, are held by a clamping bar 384 extending lengthwise of the drum. As clearly shown in Fig. 19 and Fig. 19A the clamping bar 384 carries two spaced studs 385 which are adapted to slide in sleeves 386 fixed to and extending from the inner surface of the drum. The clamping bar is normally held in clamping engagement with the periphery of the drum by reaction of two compression springs 387, each of which surrounds one of the sleeves and engages a transverse pin 388 on each of the studs and extending through longitudinal slots in the sleeve. The slidable release bar 389 located within the drum normally engages the pins 388 and includes two cam faced recesses 390 in the edge thereof. The release bar 389 includes a turned-over finger-bar 391 disposed adjacent the open end of the drum so that access can be had thereto. When the bar is in the position shown in Fig. 19, the bar is spring pressed to its clamping position because the pins 388 move into the deepest part of the recesses 390. When the release bar is slid to the left, see Fig. 19A, the pins 388 are cammed toward the periphery of the drum and the bar is accordingly moved from the surface of the drum to its release position.

A recording stylus 392, adapted to engage the surface of the recording drum 382 to make a trace on the chart paper carried thereby, is linked to the range prism carriage by a pantograph 393. As shown in Figs. 17 and 20, the pantograph as a whole is mounted on a supporting post 394 fixed to the base 729, and one end of the same is connected at 395 to a bracket 396 carried by the rods 740 and constituting a part of the range prism carriage. Accordingly, as the range prism moves, the recording stylus 392, through the pantograph, plots ranging errors directly in units of error on the chart. Looking at Fig. 17, when the range prism is in its stereoscopic coincident position the stylus will be directly above the reference line R in the center of the chart; and when the prism moves from this position, the stylus will make a zig-zag trace on either side of this reference line depending upon its position relative to the stereoscopic coincident position. One unit error will equal a given number of seconds of arc at the eye, and its value will depend upon the relative position of the parts and the mechanical advantage of the pantograph used.

Referring now to Fig. 20, the stylus 392 is carried at the end of an arm 397 mounted atop one of the pantograph arms and pivoted intermediate its ends at 398. The other end of the arm 397 loosely engages an extension of the pivot pin 399 of the pantograph and is located beneath the end of a second arm 400 carried by the adjacent arm of the pantograph end and pivoted at 401 intermediate its ends. The end 402 of the arm 400 extends below the coil of an electromagnet 403 mounted on the base 729 above the scissor point of the pantograph and constitutes an armature for said magnet. The pivot points of the arms 397 and 400 are so located that the stylus normally drops down into engagement with the surface of the recording drum. By energizing the electromagnet 403, the arms 397 and 400 will be pivoted in a direction to raise the stylus from the recording drum. The electromagnet 403 is connected in a normally open circuit, and the button for controlling the switch therefor is located adjacent to the elevation knob so that it can be operated without removing the hand from the knob, all as will be fully described hereinafter.

Tracking errors are simulated in this embodiment of the trainer by motion of the slide carrier in its own plane transversely of the optical axis. An elevation cam and an azimuth cam provide this motion. Either or both of the tracking motions can be eliminated by means of a tracking cam stop. If elevation tracking errors are introduced, the operator can correct them while he is ranging, by turning the elevation knob. He makes no correction for azimuth tracking errors. The target, however, can be manually set near one of the principal reticle marks with the aid of an azimuth adjustment.

The arrangement for simulating elevation tracking errors and correcting them will be described first. Referring now to Figs. 17 and 22, the target slide 710 is slidably mounted in a holder 304 which is pivotally mounted at 305 to an arm 306 which is in turn pivotally mounted at 307 to the base 729. This mounting permits the target to be moved substantially along the axes E—E and A—A for simulating elevation and azimuth tracking errors, respectively. An elevation cam 308 and an azimuth cam 309 are connected in side-by-side relation to the left-hand end of the drive shaft 746 by friction clutches indicated broadly as 310, see Fig. 17. Through a differential lever system, the target can be moved along the axis E—E by either the motor-driven elevation cam 308 or by the elevation knob 311. When the trainer is in operation and the elevation knob is not turned, the target is moved over a course prescribed by the elevation cam. The target thus appears to move vertically with respect to the reticle marks. When turning the elevation knob, however, the operator can compensate for the motion caused by the elevation cam, thereby always keeping the target lined up with the reticle marks as to its elevational position. The differential lever system between the target, the elevation cam and the elevation knob, which work on the same principle as the differential lever system between the range prism, the range cam, and the range knob previously set forth, will now be described.

Referring to Fig. 22, a lever 312 fulcrumed intermediate its end on a floating pivot 313 has a roller 314 on one end normally held in engagement with the elevation cam, and the roller 315 on its other end normally engaging the curved surface 316 on an abutment 317 fixed to the end of the target holder. A tension spring 318, connected at one end to a lug 319 on the lamphouse 732 and at the other end 320 to the target holder, normally holds the abutment 317 in contact with the roller 315 and tends to swing the lever 312 about its fulcrum point 313 to hold the roller 314 in contact with the elevation cam. The surface 316 is curved, as shown, to convert the tangential movement of the end of the lever 312 engaging it into a pure horizontal movement of the target holder along the axis E—E. As the lever 312 is moved clockwise about the pivot 313 by a raised portion on the elevation cam, the target holder is moved to the left of the center position with respect to the optical axis of the system. On the other hand, when a depression on the elevation cam comes opposite the roller 314, the lever 312 is moved counterclockwise by the action of the spring 318 and the target holder is moved to the right along axis E—E.

The floating pivot 313 is carried on the end of a crank 319 fixed to a horizontally extending shaft 320 rotatably mounted on a standard 321 on the base 729. At the other end of this shaft is connected a crank 322 bearing a roller 323 which is normally held in contact with a collar 324 fixed to an inclined tubular shaft 325. The upper end of the tubular shaft includes a sleeve 325' threaded to engage a threaded block 326 fixed to the base 729 by a standard 327; and the elevation knob 311 has a drive fit with the end of the sleeve 325'. The lower end of the tubular shaft 325 is slidably supported in a hanger 328 to prevent the end thereof from swinging laterally when the elevation knob is turned. Thus, by turning the elevation knob 311, the collar 324 is pulled upwardly in the direction of the axis of the shaft 325 to swing the crank 322 counterclockwise. This movement will be transmitted thru the shaft 320 and crank 319 to move the floating pivot 313 toward the elevation cam and thereby counteract the effectiveness of a depression in the cam on the target holder. On the other hand, if the collar 324 moves downwardly, this will allow the crank 322 to move clockwise under the action of the spring 318 and the crank 319 will also move clockwise to move the floating pivot 313 away from the cam to counteract the effectiveness of a high point on the cam on the target holder. It will also be appreciated that the target holder can be adjusted along the axis E—E by the elevation knob independently of the elevation cam if it be considered that the lever 312 can be swung about its end engaging the cam as a fulcrum by the crank arrangement 319, 322 acting on the pivot 313 connected to the lever 312. By virtue of this differential lever system, if the elevation cam tends to swing the lever 312 in a direction to move the target one way along the axis E—E from its center position, the elevation knob 311 need only be rotated in the proper direction, and by the proper amount, to shift the pivot point 313 of the lever 312 to counteract the effectiveness of the cam.

There may be a suitable system of stops associated with the elevational knob 311 and the fixed block 326, as indicated broadly at 330, to allow for a given number of revolutions of this knob, in this case, two, and provide limiting stops for the knob. Referring to Fig. 23, the circuit for the electromagnet 403 for lifting the stylus 392 includes a normally open microswitch 431 having an operating arm with a roller 432 at the end thereof. A shaft 433, slidably mounted in the tubular shaft 325 and terminating in a button 434 seated in a recess 435 in the center of the elevation knob 311, has a tapered end 436 held in engagement with the roller 432 by the force of gravity. The shaft 433 is normally raised by the spring of the switch; and by pressing down on the button 434, without removing the hand from the elevation knob, the switch can be closed to energize the electromagnet 403 to cause the stylus to be raised from the surface of the recording drum.

Coming now to the azimuth tracking lever system, this includes a lever 837 pivoted at one end 838 eccentrically of a stubshaft 839. The other end of the lever includes a roller 840 which bears against the upper edge 841 of the target holder, and a roller 842 carried by the lever intermediate its end normally engages the periphery of the azimuth cam 369. It will thus be seen that as a high point on the cam engages the roller 842 it will swing the lever clockwise about the end 838 as a fulcrum, and will move the target holder upwardly along the axis A—A. On the other hand, as a low point on the cam comes opposite the roller 842, the spring 318 causes the target holder to move downwardly on the axis A—A. There is no manually controlled correcting system for the simulated azimuth tracking error. If it is desired to adjust the azimuth position of the target by hand, this can be done by rotating the stubshaft 839 by the hand lever 843 connected thereto, whereupon the eccentricity of the point 838 will cause the end of the lever to be swung in one direction, and with the roller 842 acting as the fulcrum for the lever, the other end thereof engaging the target holder moves in an opposite direction to control the position of the target with respect to the A—A axis. This manual adjustment is not for correcting the azimuth tracking error, but is used primarily only when the azimuth cam is disconnected and to permit the target to be set near one of the principal reticle marks.

Either one or both of the tracking motions can be eliminated by means of a tracking cam stop mechanism now to be described. Looking at Figs. 17 and 22, this cam stop mechanism comprises a lock 844 rotatably mounted on a bracket 845 fixed to the base 729, and including a narrow radially projecting portion 846 and a substantially wide radially projecting arcuate portion 847. This lock is adapted to be turned between four positions by means of a knob 848 attached thereto; one position being the inoperative position shown in Fig. 17 in which the projecting portion 846 lies between the elevation and azimuth cams, second and third positions, wherein the projecting portion 846 is turned to the right or left to engage a radial slot 849 or 850 in the elevation or azimuth cams, respectively, to lock one or the other of the same; or a fourth position in which the wide projecting portion 847 is adapted to engage the slots in the two cams simultaneously to lock them both. The lock and its associated knob carries a spring pressed ball 851 which is adapted to snap into notches in the top of the bracket 845 to frictionally locate the lock in any one of its four positions. The friction clutch arrangement 310 between the elevation and azimuth cams and the drive shaft 746 permits either or both of these cams to be held while the drive shaft 746 continues to rotate.

Between the motor-driven shaft 754 and the driving gear 753 there is a manually releasable clutch to permit the drive shaft 746 to be rotated by hand for locating the clamping bar on the recording drum in an accessible position; or to permit bringing the slots in the elevation or azimuth cams into engagement with the lock therefore; or for any other desired reason. While this clutch may be of any suitable construction, we have shown it as comprising a spring pressed jaw clutch, one jaw of which, not shown, is connected to the gear on the shaft for driving gear 753, and the other jaw of which, not shown, includes a sleeve 816 which is slidably mounted on the shaft 754 and is normally spring pressed into engagement with the other jaw by a compression spring 854, see Fig. 16. The clutch can be released by merely gripping the sleeve 816 and pulling it to the left, see Fig. 16; and so that a good grip can be had on the sleeve, the periphery of the same is provided with a plurality of spaced circumferential grooves, as shown.

It is desirable that the instrument be automatically stopped after the recording drum has made one revolution. To accomplish this, the motor circuit is controlled by a normally opened push button switch 460. Connected in parallel with this push button switch is a normally opened microswitch 461 the operating arm 462 of which includes a roller 463 normally engaging the flange 464 on the recording drum which has a peripheral contour constituting a cam, the high point of which closes the microswitch 461 and the low point of which allows the switch to open, see Fig. 20. Therefore, to start a test, the push button motor switch 460 is held down for a short interval, about three seconds, the time depending upon the length of the depression in the cam 464, and during this interval the cam on the recording drum closes microswitch 461 to keep the motor running for the duration of the test and stops it at the end of the test, or when the recording drum has made approximately one complete revolution.

While, for the purpose of disclosing our present invention, we have shown the instrument in a form particularly useful in the selection and training of military personnel, and for which purpose the instrument is capable of elevation and/or azimuth tracking errors in combination with range variations, it will be readily appreciated that the same could be readily modified for regular ophthalmic use without going beyond the scope of the present invention. For instance, in regular opthalmic procedure, if it were desired to test the stereo acuity of a patient, an instrument capable only of range variations of a target might be desired. If, on the other hand, it were thereafter desired to develop, or exercise, the stereo acuity of a person found defective in this respect, an instrument capable of the combined variation in range and elevation of a target might be desired. Accordingly, inasmuch as we have disclosed an instrument in which anyone of the range varying, elevation tracking and azimuth tracking mechanisms may be used independently of the other two or in combination with one or both of the other two, it will be appreciated that the present invention includes an instrument making use of any one or any combination of these three adjustments of the target.

While we have shown and described certain specific embodiments of our invention, we are fully aware that many modifications thereof are possible. Our invention, therefore, is not to be limited to the precise details of construction shown and described, but is intended to cover all modifications coming within the scope of the appended claims.

Having thus described our invention, what we claim as new and desire to secure by Letters Patent of the United States is:

1. A device of the type described, comprising a reference mark; eye fixation means; an optical viewing system permitting said mark and eye fixation means to be binocularly viewed simultaneously; a driven mechanism for causing a continuous relative axial movement of the binocularly viewed images of said mark and eye fixation means to simulate varying range conditions of the eye fixation means; a mechanism, under the manual control of the observer, for causing a relative axial movement of the binocularly viewed images of said mark and eye fixation means independently of said driven mechanism, whereby an observer can counteract the effectiveness of said driven mechanism and keep the images of said mark and eye fixation means at the same distance from the point of observation; a second driven mechanism for causing a continuous relative transverse movement of the positions of said binocularly viewed images to simulate tracking errors; and means, under the manual control of the observer for causing a relative transverse movement of the position of said binocularly viewed images independently of said second driven mechanism, whereby an observer can counteract the effectiveness of said driven mechanism and keep the image of the eye fixation means at a given point on said reticle.

2. A device of the type described, comprising a reticle; a target; means for forming two distinguishable real images of said target on said reticle; means for stereoptically viewing said images as stereo separations, whereby a single stereo image is observable, and for simultaneously binocularly viewing the reticle; driven mechanism for continuously varying the lateral separation of said real images of the target to cause said stereo image to move axially relative to said reticle and simulate a continuous variation in range of the target; driven mechanism for causing a continuous movement of said stereo image transversely of said reticle to simulate a continuous variation in tracking of the target; a mechanism, adapted to be manually controlled by the observer, for varying the lateral separation of said real images independently of said driven range varying mechanism and for counteracting the effectiveness of said mechanism; a second mechanism, adapted to be manually controlled by the observer, for causing a movement of said stereo image transversely of said reticle independently of said driven tracking mechanism, whereby it is possible for an observer to keep the position of said stereo image matched with the position of the reticle from the point of observation, and to keep the position of the stereo image at a given point on said reticle with relation to its movement transversely thereof, respectively.

3. A device according to claim 2, and in which the driven mechanism and said second manually-operated mechanism for causing a movement of said stereo image transversely of said reticle include parts common to both mechanisms; means for manually and selectively rendering said driven mechanism ineffective while at the same time leaving the parts common to both mechanisms in a condition to permit manual adjustment of the position of the stereo image transversely of the reticle through operation of said second mechanism.

4. A device of the type described, comprising a reference mark; eye fixation means; a binocular viewing system permitting said mark and eye fixation means to be binocularly viewed simultaneously; a driven mechanism for causing a continuous relative axial movement of the binocularly viewed images of said mark and eye fixation means to simulate varying range of the eye fixation means; and a mechanism, adapted to be manually controlled by an observer, for causing a relative axial movement of the binocularly viewed images of said mark and eye fixation means independently of said driven mechanism, whereby the observer can counteract the effectiveness of said driven mechanism and keep the images of said mark and eye fixation means at the same distance from the point of observation; and means indicating the degree of actual axial displacement between the images of the mark and eye fixation means at any instant.

5. A device according to claim 4, and including means for continuously recording the degree of actual displacement between the positions of the images of the reference mark and eye fixation means.

6. A device according to claim 2, and in which means are provided for manually disconnecting the driven mechanism for continuously moving the stereo image transversely of the reticle.

7. A device according to claim 2, and including means for indicating the degree of actual displacement between the axial position of the stereo image relative to the reticle at any instant.

8. A device according to claim 2, and including means for continuously recording the degree of actual displacement between the axial position of the stereo image and the reticle.

9. A device according to claim 2, and including means for continuously recording the degree of actual displacement between the axial position of the stereo image and the reticle, said means including a recording surface, means for moving the same at a given rate, a stylus normally contacting the recording surface and adapted to leave a trace thereon, and movable substantially transversely of the direction of movement of said recording surface, and means connecting said stylus to the means causing a variation in the lateral separation of the real images of the target, whereby said stylus is continuously moved relative to said recording surface and an index line thereon in accordance with the degree of actual displacement between the axial position of the stereo image and the reticle.

10. A device of the type described comprising a reticle, a target, means for forming two distinguishable real images of said target on said reticle, means for stereoptically viewing the images as stereo separations, whereby a single stereo image is observable, and for simultaneously viewing the reticle binocularly, means for causing a continuous movement of the position of said stereo image axially relative to said reticle to simulate a variation in range of the target, and including a power-driven cam which continually varies the lateral separation of said real images of the target means for causing a continuous movement of the stereo image transversely of the optical axis of the reticle in one plane to simulate a variation in elevation of the target, means for causing a continuous movement of the stereo image transversely of the optical axis of the reticle at right angles to said first-mentioned plane to simulate a variation in azimuth of the target, manually controllable ranging means for varying the lateral separation of said real images of the target independently of said cam-driven means for counteracting the effectiveness of said range varying mechanism, whereby it is possible for an observer to keep the position of the stereo image matched with the position of the reticle from the point of observation, a manually controlled elevation tracking mechanism for shifting the position of the stereo image transversely of the optical axis of said reticle independently of said elevation varying means for the purpose of counteracting the effectiveness of said elevation varying means, whereby it is possible for an observer to keep the position of the stereo image at a given point on the reticle with relation to its elevational change.

11. A device according to claim 10, and including manually operable means for rendering the azimuth varying means inoperative and for manually adjusting the stereo image to a given azimuth position on the reticle independently of the range and elevation varying means.

12. A device according to claim 10, and including separate manually operable means for optionally rendering the azimuth and elevation varying means inoperative independently of one another and the range adjusting mechanism, and for individually manually adjusting the stereo image to a given azimuth and elevation position on the reticle independently of the range adjusting mechanism.

13. A device of the type described comprising a reticle, a target, means for forming two distinguishable real images of said target on said reticle, means for stereoptically viewing the images as stereo separations, whereby a single stereo image is observed, and for simultaneously viewing the reticle binocularly, range varying means for continually altering the lateral separation of said real images of the target to cause said stereo image to move axially relative to said reticle to simulate a variation in range of the target, means for causing a continuous movement of the stereo image transversely of the optical axis of the reticle to simulate a variation in elevation of the target, manually controlled ranging means for altering the separation of said real images of the target independently of said range varying means and for counteracting the effectiveness of said range varying means, whereby it is possible for an observer to keep the position of the stereo image matched with the position of the reticle from the point of observation, a manually controlled elevation tracking mechanism for counteracting the effectiveness of said elevation varying mechanism, whereby it is possible for an observer to keep the position of the stereo image at a given point on the reticle with relation to its elevational change.

14. A device according to claim 13 and in which each of the range varying means and elevation varying means includes a continuously operated cam, a member oscillatable over a given path, and a differential driving connection between the cam and oscillatable member.

15. A device according to claim 13 and in which each of the range varying means and elevation varying means includes a member oscillatable over a given path, a continuously operated cam, and a differential driving connection between the cam and oscillatable member, and the manually controlled ranging and elevational tracking mechanisms include separate manually controlled members respectively connected to said differential drives to counteract the normal effectiveness of each thereof on the oscillatable members.

16. A device according to claim 13 and in which each of the range varying means and elevation varying means includes a member oscillatable over a given path, a continuously operated cam, and a differential driving connection between the cam and oscillatable member including a pivoted driving lever the fulcrum of which is adjustable to alter the degree of movement of which the same is capable under the action of the cam, and the manually controlled ranging and elevational tracking mechanisms include separate manually controlled members for adjusting the fulcrums of said pivoted levers.

17. A device of the type described comprising a reticle, a target, means for forming two distinguishable real images of said target on said reticle, means for stereoptically viewing the images as stereo separations, whereby a single stereo image is observed which constitutes eye fixation means, and for simultaneously viewing the reticle binocularly, range varying means for continually altering the stereo separation of said real images to continually shift the position of said eye fixation means axially relative to said reticle, and including a member mounted to reciprocate over a given path, means for reciprocating said member continuously and including a cam, and manually controllable ranging means separate from said range varying means for counteracting the effectiveness of said reciprocating means on said member in an effort to keep the position of said eye fixation means matched with the position of the reticle from the point of observation, and means for continuously exhibiting the degree of actual displacement between the position of the eye fixation means and reticle.

18. A device of the type described comprising a reticle, a target, means for forming two distinguishable real images of said target on said reticle, means for stereoptically viewing the images as stereo separations, whereby a single stereo image is observed which constitutes eye fixation means, and for simultaneously viewing the reticle binocularly, range varying means for continually altering the stereo separation of said real images to continually shift the position of said eye fixation means axially relative to said reticle, and including a member mounted to reciprocate over a given path, means for continuously reciprocating said member and including a driving cam, a differential driving mechanism between said cam and member including a part the position of which can be varied during the driving function of the mechanism to counteract the effectiveness of said cam on the member, and range tracking means capable of manual control by the observer for continuously varying the position of said part in an effort to keep the position of said eye fixation means matched with the position of the reticle from the point of observation, and means for continuously recording the degree of actual displacement between the position of the eye fixation means and reticle.

19. A device according to claim 18, and in which the differential driving mechanism between the cam and reciprocating member comprises a linkage, one link of which has an adjustable fulcrum an adjustment of which will counteract the effectiveness of said cam on said reciprocal member, and means under the manual control of the observer for shifting said fulcrum in an effort to keep the position of said eye fixation means matched with the position of the reticle from the point of observation.

20. A device according to claim 18, and in which the recording means includes a stylus connected to the reciprocal member to be moved in conjunction therewith and cooperating with a movable recording surface.

21. A device according to claim 18, in which the differential driving means between the cam and reciprocating member comprises a rotatable drum in rolling contact with a surface, a belt frictionally engaging said drum and connected at one end to said reciprocating member, a connection between the axle of said drum and the cam whereby the latter causes a shifting of the drum axle and a subsequent rotation of the drum and a movement of the belt, and the range tracking means comprises manually controllable means for directly rotating said drum to counteract the effectiveness of the cam in this respect in an effort to keep the position of said eye fixation means matched with the position of the reticle from the point of observation.

22. A device according to claim 18, and including means between the manual control of the range tracking means and the driving mechanism for preventing motion of the former by the latter so that the observer cannot feel the driving tendency of the driving mechanism which he is to counteract.

23. A device of the type described comprising a reticle, a target, means for forming two distinguishable real images of said target on said reticle, means for forming two distinguishable real images of said target on said reticle, means for stereoptically viewing the images as stereo separations, whereby a single stereo image is observed, and for simultaneously viewing the reticle binocularly, range varying means continually altering the separation of said two real images of the target for causing a continuous movement of the position of said stereo image axially relative to said reticle to simulate a variation in range of the target, a manually controlled range tracking mechanism adapted to alter the separation of said two real images of the target independently of said range varying means for counteracting the effectiveness of said range varying mechanism, whereby it is possible for an observer to keep the position of the stereo image matched with the position of the reticle from the point of observation, means for recording the degree of actual displacement between the position of the stereo image and reticle at any instant, and including a stylus normally contacting a movable recording surface and connected to a movable member of the range varying mechanism to be moved relative to said recording surface in response to movement thereof, and means under the manual control of the observer for lifting said stylus from the recording surface.

24. A device according to claim 23, and in which the stylus lifting means includes an electro-magnetic means the circuit of which is under the manual control of the observer.

25. A device according to claim 23, and in which the stylus lifting means includes an operating member located relative to the manual control member of the range tracking mechanism, whereby the observer can cause a lifting of the stylus without necessitating the removal of the hand from the control member of the range tracking mechanism.

26. A device according to claim 18, and in which the differential driving means between the cam and the reciprocating member comprises a lever free to float in a given plane and having three fulcrum points about which the lever can swing in said plane, one of said fulcrum points connected to said cam to be translated in said plane thereby, a second of said fulcrum points connected to said reciprocal member, and the third fulcrum point, when stationary, determining the extent of translation of the second fulcrum in response to a translation of the first fulcrum point by said cam, whereby the translation of the second fulcrum in response to a translation of the first fulcrum can be modified in extent by a translation of the third fulcrum point relative to the other two even to the extent of remaining stationary while the first fulcrum is being translated.

27. A device according to claim 18, and in which the differential driving means between the cam and the reciprocating member comprises a lever free to float in a given plane and having three fulcrum points about which the lever can swing in said plane, one of said fulcrum points connected to said cam to be translated in said plane thereby, a second of said fulcrum points connected to said reciprocal member, and the third fulcrum point, when stationary, determining the extent of translation of the second fulcrum in response to a translation of the first fulcrum point by said cam, whereby the translation of the second in response to a translation of the first fulcrum can be modified in extent by a translation of the third fulcrum point relative to the other two even to the extent of remaining stationary while the first fulcrum is being translated, and in which the tracking means comprises a manually controlled member connected to said third fulcrum point to cause a translation thereof relative to the other two fulcrum points.

28. A device of the type described comprising a reticle, a target means for forming two distinguishable real images of said target on said reticle, means for stereoptically viewing the images as stereo separations, whereby a single stereo image is observed which constitutes eye fixation means, and for simultaneously viewing the reticle binocularly, means for varying the stereo separation of said real images to vary the apparent position of said eye fixation means axially relative to said reticle and to simulate a variation in range of the target, and including a member mounted to reciprocate over a given path, power operated driving means for continuously reciprocating said member to vary the range of the target, a manually operated driving means for reciprocating said member independently of, and counter to, said power driving means, and constituting a tracking mechanism, whereby said member can be shifted by the observer in an effort to keep the apparent position of the eye fixation means matched with the position of the reticle.

29. A device of the type described comprising a reticle, a target means for forming two distinguishable real images of said target on said reticle, means for stereoptically viewing the images as stereo separations, whereby a single stereo image is observed, which constitutes eye fixation means, and for simultaneously viewing the reticle binocularly, means for varying the stereo separation of said images to vary the position of said eye fixation means axially relative to said reticle and to simulate a variation in range of the target, and including a member mounted to reciprocate over a given path, power operated driving means for continuously reciprocating said member to vary the range of the target, a manually operated driving means for reciprocating said member independently of, and counter to, said power driving means and constituting a tracking mechanism, whereby said member can be shifted by the observer in an effort to keep the position of the eye fixation means matched with the position of the reticle, and recording means for continuously recording the degree of actual displacement of said reciprocal member from a given position in which the position of the eye fixation means is matched with the position of the reticle.

30. A device according to claim 29, and in which said recording means includes a pantograph connected to said reciprocal member to be moved thereby, said pantograph including a stylus normally held in contact with a moving recording surface.

31. A device according to claim 29, and in which the manually operated driving means for reciprocating said member includes a flexible coupling adapted to give way when a given resistance is encountered, whereby the mechanism will not be strained should the observer attempt to move said reciprocal member beyond its range of movement.

32. A device according to claim 29, and in which the power operated driving means and manually operated driving means for said reciprocal member are so arranged that movement of the member by the former driving means is not transmitted to the manual control member of the latter driving means in the form of a resistance which can be felt by the observer.

33. A device according to claim 29, and in which the manually operated driving means for reciprocating said member includes a friction clutch which is adapted to slip when a given resistance is encountered, whereby the mechanism will not be strained should the observer attempt to move said reciprocal member beyond its range of movement.

34. A device according to claim 29, and in which the manually operated driving means for the reciprocal member includes a flexible power transmitting member which is adapted to give when a given resistance is encountered, whereby the mechanism will not be strained should the observer attempt to move said reciprocal member beyond its range of movement.

OTTO WITTEL.
GEORGE J. KOCH.
JOSEPH L. BOON.

REFERENCES CITED

The following references are of record in the file of this patent:

UNITED STATES PATENTS

| Number | Name | Date |
|---|---|---|
| 2,192,385 | Reason | Mar. 5, 1940 |
| 2,278,203 | Lepetit | Mar. 31, 1942 |
| 511,637 | Dietmann | Dec. 26, 1893 |
| 1,943,205 | Coradi | Jan. 9, 1934 |
| 2,149,148 | Rome | Feb. 28, 1939 |
| 2,238,207 | Ames, Jr., et al. | Apr. 15, 1941 |

(Other references on following page)

UNITED STATES PATENTS

| Number | Name | Date |
|---|---|---|
| 2,213,484 | Briggs | Sept. 3, 1940 |
| 2,262,217 | Wettering | Nov. 11, 1941 |
| 2,041,719 | Loy | May 26, 1936 |
| 934,916 | Hofe | Sept. 21, 1909 |
| 2,239,469 | Reason | Apr. 22, 1941 |
| 2,262,524 | Ball | Nov. 11, 1941 |
| 2,174,308 | Hartinger | Sept. 26, 1939 |
| 2,362,588 | Shepard | Nov. 14, 1944 |
| 2,263,971 | King et al. | Nov. 25, 1941 |
| 1,481,006 | Hammond | Jan. 15, 1924 |
| 1,698,221 | Craig | Jan. 8, 1929 |
| 1,899,135 | Cameron | Feb. 28, 1933 |
| 2,224,064 | Schnittger | Dec. 3, 1940 |
| 1,542,634 | Schneider | June 16, 1925 |

FOREIGN PATENTS

| Number | Country | Date |
|---|---|---|
| 413,750 | Great Britain | July 26, 1934 |
| 441,773 | Germany | Mar. 15, 1927 |
| 428,759 | Great Britain | May 17, 1935 |